(12) United States Patent
Ikeda et al.

(10) Patent No.: US 12,320,478 B2
(45) Date of Patent: Jun. 3, 2025

(54) LIGHTING DEVICE

(71) Applicant: Japan Display Inc., Tokyo (JP)

(72) Inventors: Kojiro Ikeda, Tokyo (JP); Takeo Koito, Tokyo (JP); Keiji Takizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/796,776

(22) Filed: Aug. 7, 2024

(65) Prior Publication Data

US 2024/0392934 A1 Nov. 28, 2024

Related U.S. Application Data

(63) Continuation of application No. PCT/JP2023/000297, filed on Jan. 10, 2023.

(30) Foreign Application Priority Data

Feb. 18, 2022 (JP) ................................. 2022-023969

(51) Int. Cl.
*F21K 9/65* (2016.01)
*F21V 14/00* (2018.01)
(Continued)

(52) U.S. Cl.
CPC .............. *F21K 9/65* (2016.08); *F21V 14/003* (2013.01); *F21Y 2105/18* (2016.08); *F21Y 2113/13* (2016.08); *F21Y 2115/10* (2016.08)

(58) Field of Classification Search
CPC .................................. F21K 9/65; F21V 14/003
(Continued)

(56) References Cited

U.S. PATENT DOCUMENTS 9,587,805 B2 * 3/2017 Ryu ...................... F21V 23/045
10,598,349 B2 * 3/2020 Du ............................ F21K 9/69
(Continued)

FOREIGN PATENT DOCUMENTS

JP 2005-317879 A 11/2005
JP 2007-047229 A 2/2007
(Continued)

OTHER PUBLICATIONS

Search Report issued in related International Patent Application No. PCT/JP2023/000297 mailed on Feb. 28, 2023 and English translation of same. 5 pages.

(Continued)

*Primary Examiner* — Bryon T Gyllstrom
(74) *Attorney, Agent, or Firm* — K&L Gates LLP

(57) ABSTRACT

A lighting device includes a light source including at least two types of light emitting elements with different color temperatures, an optical element including a plurality of liquid crystal cells and configured to control a distribution of light emitted from the light source, and a control unit configured to control the light source. The control unit controls the optical element to change from a first light distribution state to a second light distribution state different from the first light distribution state. The control unit controls the light source so that a color temperature of light emitted in a direction perpendicular to a surface of the optical element is the same in the first light distribution state and the second light distribution state.

6 Claims, 21 Drawing Sheets

(51) Int. Cl.
*F21Y 105/18* (2016.01)
*F21Y 113/13* (2016.01)
*F21Y 115/10* (2016.01)

(58) Field of Classification Search
USPC ........................................................ 362/241
See application file for complete search history.

(56) References Cited

U.S. PATENT DOCUMENTS

| | | | |
|---|---|---|---|
| 10,955,700 B2* | 3/2021 | Fukushima | H01L 33/58 |
| 11,333,323 B2* | 5/2022 | Baronian | F21V 9/12 |
| 11,391,440 B2* | 7/2022 | Halbritter | F21V 23/003 |
| 2005/0243237 A1* | 11/2005 | Sasuga | F21V 14/003 |
| | | | 349/57 |
| 2007/0030240 A1* | 2/2007 | Sumiyoshi | G02F 1/133605 |
| | | | 345/102 |
| 2007/0058108 A1* | 3/2007 | Uehara | G02B 6/0076 |
| | | | 349/86 |
| 2010/0149444 A1* | 6/2010 | Hikmet | G02F 1/134363 |
| | | | 349/122 |
| 2012/0169953 A1* | 7/2012 | Kataoka | F21K 9/232 |
| | | | 349/36 |

FOREIGN PATENT DOCUMENTS

| | | |
|---|---|---|
| JP | 2007-079093 A | 3/2007 |
| JP | 2010-230887 A | 10/2010 |
| JP | 2014-160277 A | 9/2014 |
| WO | WO2011/030578 A1 | 3/2011 |

OTHER PUBLICATIONS

English translation of Office Action issued in related Japanese Patent Application No. 2024-501015, mailed on Nov. 5, 2024. 3 pages.

* cited by examiner

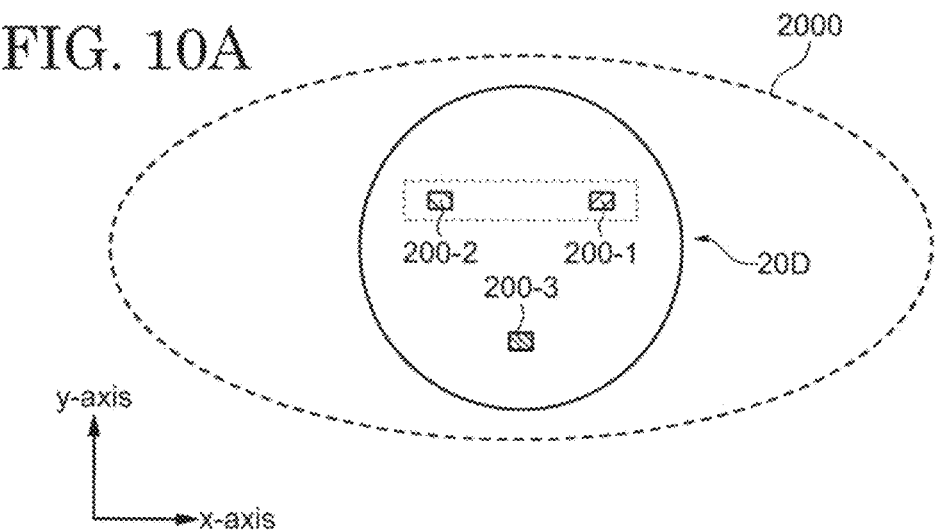
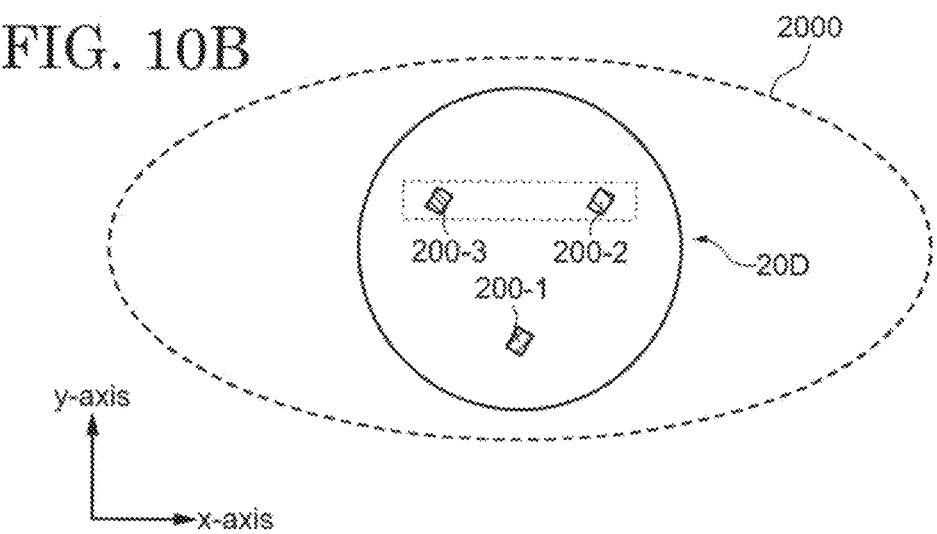
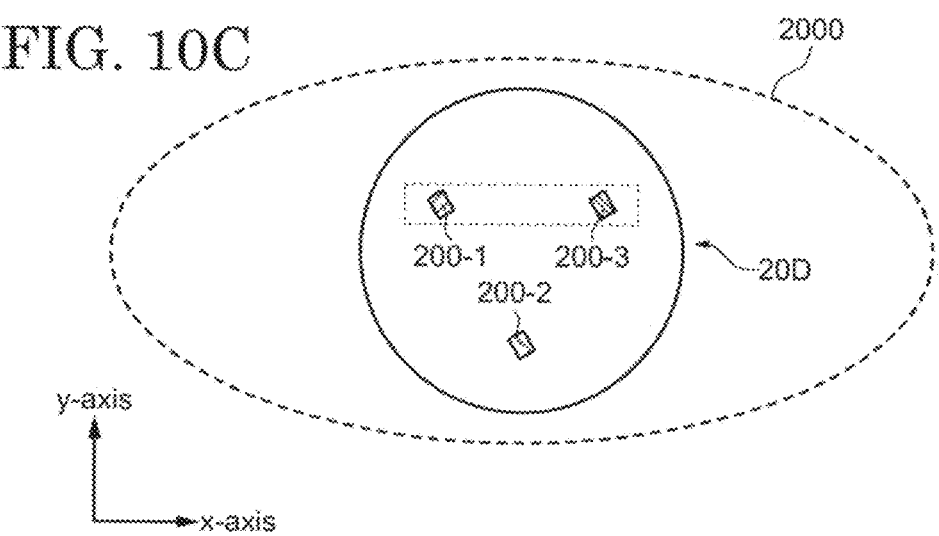

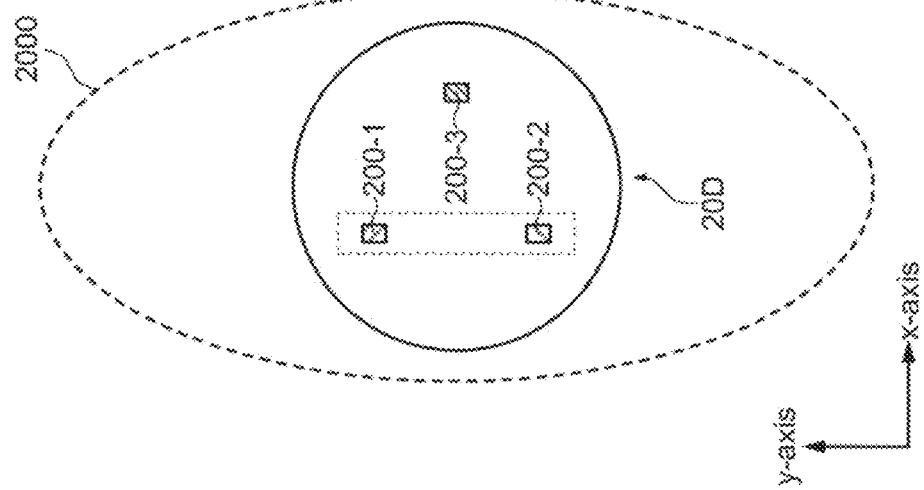
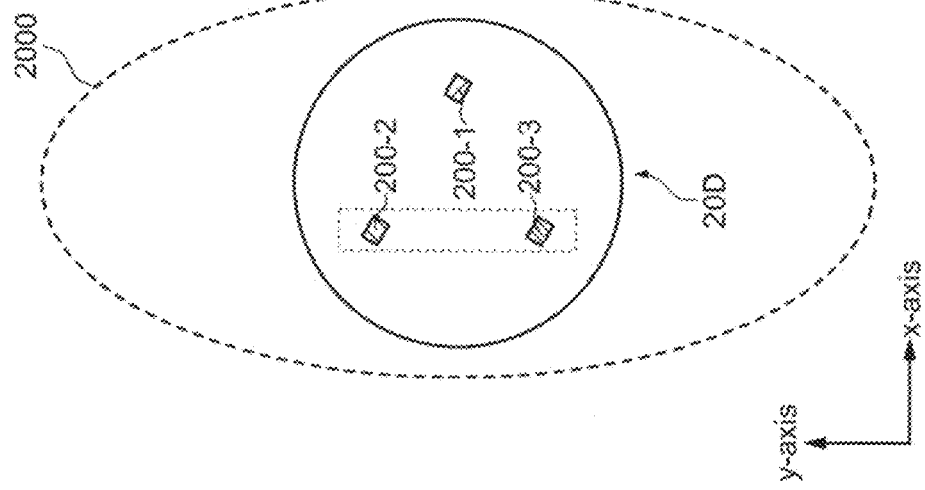
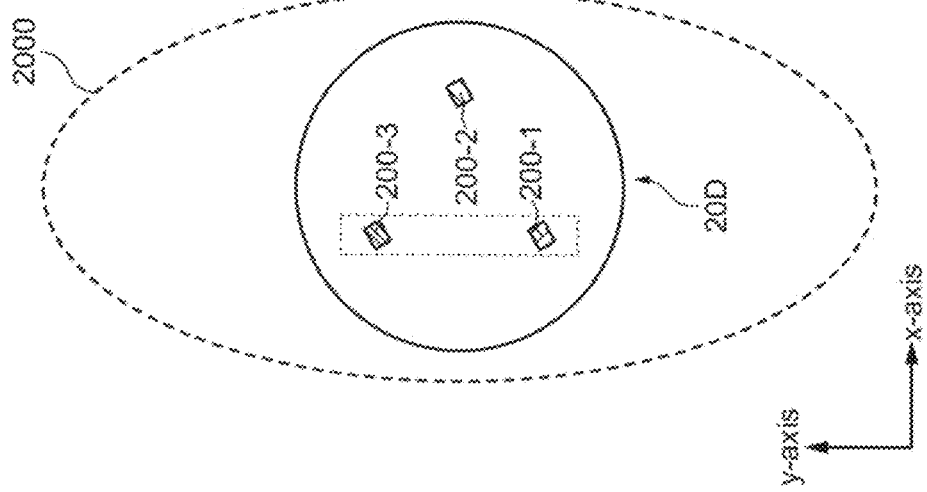

LIGHTING DEVICE

CROSS-REFERENCE TO RELATED APPLICATIONS

This application is a Continuation of International Patent Application No. PCT/JP2023/000297, filed on Jan. 10, 2023, which claims the benefit of priority to Japanese Patent Application No. 2022-023969, filed on Feb. 18, 2022, the entire contents of which are incorporated herein by reference.

FIELD

An embodiment of the present invention relates to a lighting device including an optical element to control a light distribution using a liquid crystal.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication Nos. 2005-317879, 2010-230887, or 2014-160277). For example, lighting devices described in Japanese laid-open patent publication Nos. 2005-317879 A and JP 2010-230887 use a liquid crystal lens to distribute light irradiated from a light source in a circular shape. Further, in the beam shaping device described in Japanese laid-open patent publication No. 2014-160277, the light distribution shapes are changed by changing the pattern of electrodes that apply a voltage to the liquid crystal.

SUMMARY

A lighting device according to an embodiment of the present invention includes a light source including at least two types of light emitting elements with different color temperatures, an optical element including a plurality of liquid crystal cells stacked in order and configured to control a distribution of light emitted from the light source, and a control unit configured to control the light source. The control unit controls the optical element to change from a first light distribution state to a second light distribution state different from the first light distribution state. The control unit controls the light source so that a color temperature of light emitted in a direction perpendicular to a surface of the optical element is the same in the first light distribution state and the second light distribution state.

BRIEF DESCRIPTION OF DRAWINGS

FIG. 10A is a schematic plan view showing an arrangement of light emitting elements of a light source of a lighting device according to an embodiment of the present invention.

FIG. 10B is a schematic plan view showing an arrangement of light emitting elements of a light source of a lighting device according to an embodiment of the present invention.

FIG. 10C is a schematic plan view showing an arrangement of light emitting elements of a light source of a lighting device according to an embodiment of the present invention.

FIG. 11D is a schematic plan view showing an arrangement of light emitting elements of a light source of a lighting device according to an embodiment of the present invention.

FIG. 11E is a schematic plan view showing an arrangement of light emitting elements of a light source of a lighting device according to an embodiment of the present invention.

FIG. 11F is a schematic plan view showing an arrangement of light emitting elements of a light source of a lighting device according to an embodiment of the present invention.

DESCRIPTION OF EMBODIMENTS

Figure 1A:
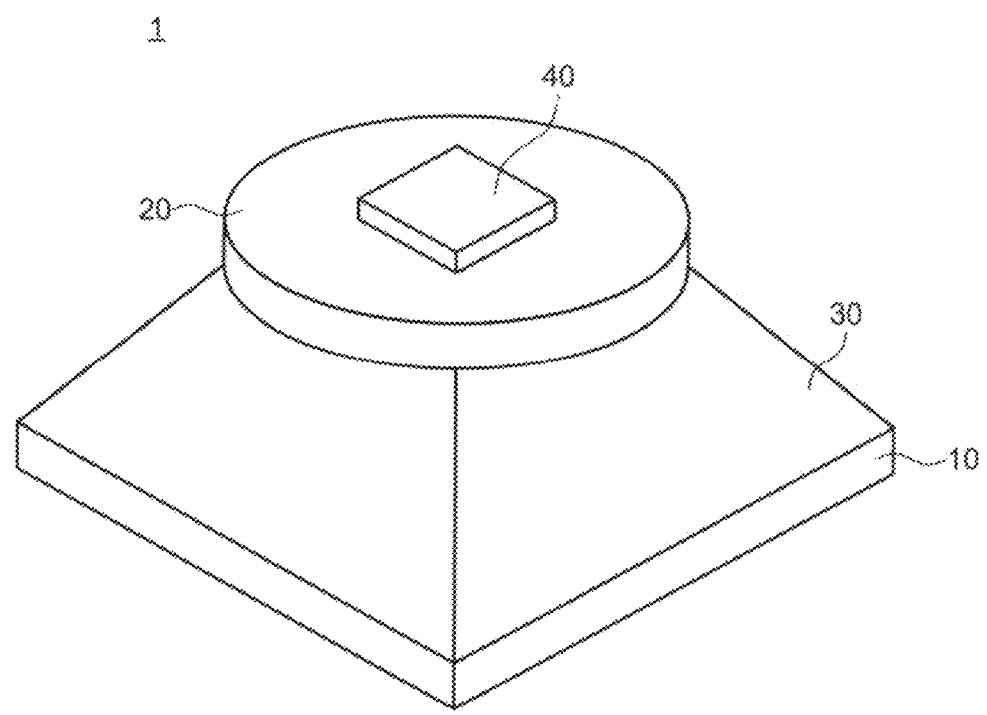
FIG. 1A is a schematic perspective view of a lighting device according to an embodiment of the present invention.

Depending on the application, there are cases where a change in color temperature accompanying a change in the shape of a light distribution is not desired for a lighting device. However, in a conventional optical element including a liquid crystal cell, the color temperature of light emitted from the optical element changes when turning the liquid crystal cell on and off.

An embodiment of the present invention can provide a lighting device that as much as possible suppresses or eliminates a change in the color temperature of emitted light when the distribution angle of the emitted light is changed.

In the following description, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via yet another structure over a certain structure, are both included.

First Embodiment

A lighting device 1 according to an embodiment of the present invention is described with reference to FIGS. 1A to 7.

[1. Configuration of Lighting Device 1]

Figure 1B:
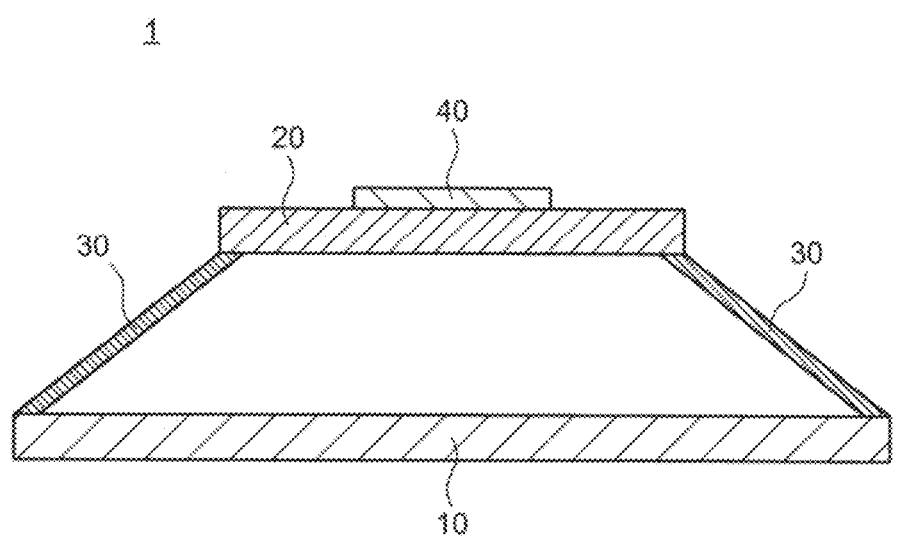
FIG. 1B is a schematic cross-sectional view of a lighting device according to an embodiment of the present invention.

FIGS. 1A and 1B are respectively a schematic perspective view and a schematic cross-sectional view of the lighting device 1 according to an embodiment of the present invention. As shown in FIGS. 1A and 1B, the lighting device 1 includes an optical element 10, a light source 20, a reflector 30, and a control unit 40. The light source 20 can irradiate light. The reflector 30 can reflect the light irradiated from the light source 20. The optical element 10 emits light that been irradiated from the light source 20 or reflected by the reflector 30 and transmitted or diffused. That is, the optical element 10 can change the light distribution angle. The control unit 40 can control the optical element 10 and the light source 20 so that the chromaticity of the light emitted from the optical element 10 is constant. Therefore, the lighting device 1 can emit light with a small change in color temperature even when the angle of the distribution light is changed by the optical element 10.

In addition, the light distribution angle is an angle that indicates the diffusion distribution of light, and an angle in the direction perpendicular to the surface of the optical element 10 is defined as 0 degrees in the present specification.

The configurations of the optical element 10, the light source 20, and the control unit 40 are described later, and the configuration of the reflector 30 is described here.

The reflector 30 is disposed between the optical element 10 and the light source 20, and separates the optical element 10 from the light source 20. The reflector 30 has a cylindrical structure including two opened end surfaces. The cylindrical structure of the reflector 30 is configured such that a side surface is inclined from one end surface to the other end surface. The size of the opening of the end surface is appropriately determined according to the size of the optical element 10 or the light source 20, and the entire end surface may be opened, or a part of the end surface may be opened. The opening of one end surface is blocked by the optical element 10, and the opening of the other end surface is blocked by the light source 20. In other words, the lighting device 1 has an internal space closed by the optical element 10, the light source 20, and the reflector 30.

Although the reflector 30 is made of a metal member or a resin member, the surface of the reflector 30 corresponding to the side surface of the internal space is made of a metal member capable of reflecting light, such as aluminum. Thus, the reflector 30 can reflect the light irradiated from the light source 20. In addition, a transparent protective film for protecting the metal member may be provided on the surface of the metal member.

In addition, although the optical element 10 and the light source 20 shown in FIGS. 1A and 1B have a rectangular shape and a circular shape, respectively, the shapes of the optical element 10 and the light source 20 are not limited thereto. The optical element 10 and the light source 20 may both have a rectangular shape or a circular shape.

[2. Configuration of Optical Element 10]

Figure 2:
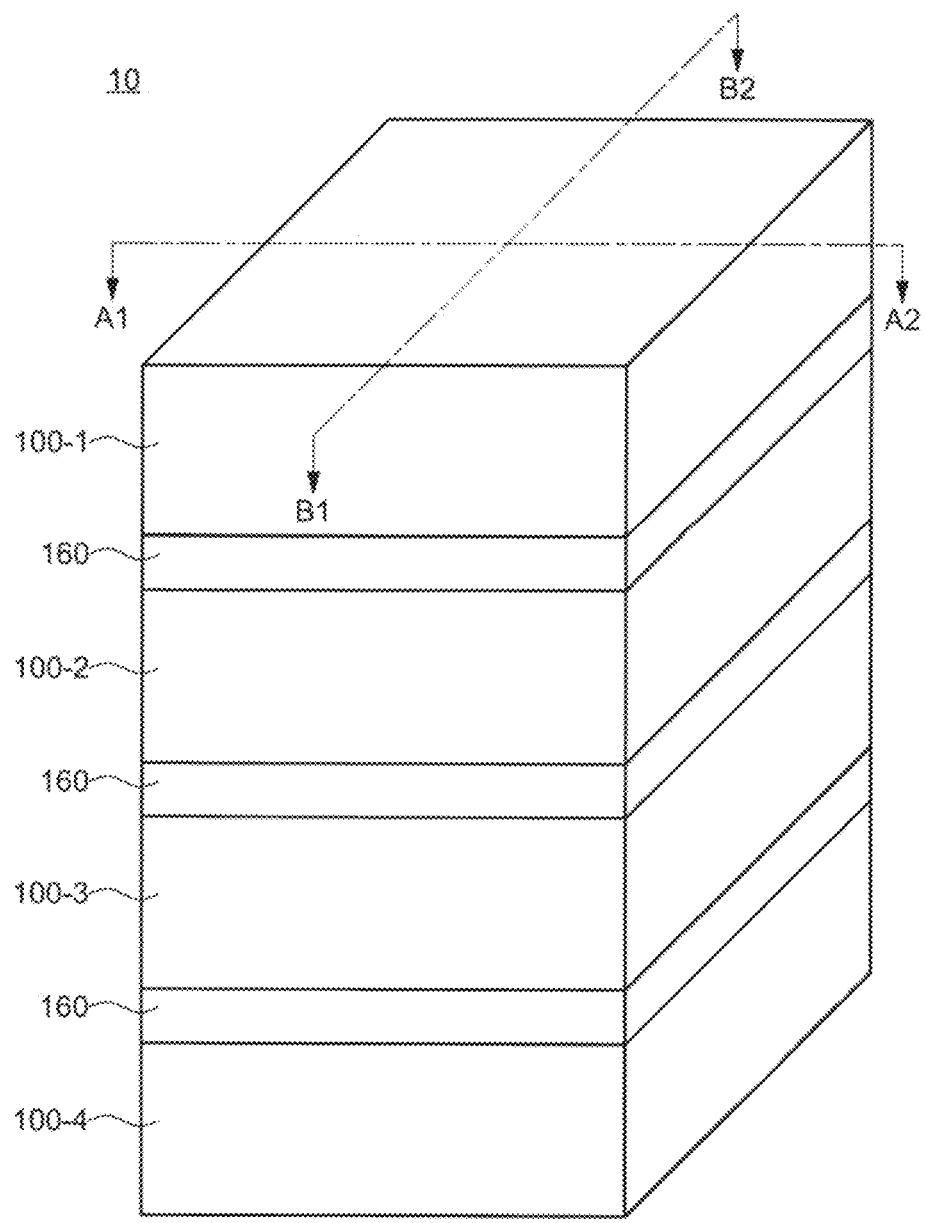
FIG. 2 is a schematic perspective view of an optical element of a lighting device according to an embodiment of the present invention.

FIG. 2 is a schematic perspective view of the optical element 10 of the lighting device 1 according to an embodiment of the present invention. As shown in FIG. 2, the optical element 10 includes a plurality of liquid crystal cells 100 (a first liquid crystal cell 100-1, a second liquid crystal cell 100-2, a third liquid crystal cell 100-3, and a fourth liquid crystal cell 100-4) which are stacked in a z-axis direction. Light irradiated from the light source 20 is transmitted through the first liquid crystal cell 100-1, the second liquid crystal cell 100-2, the third liquid crystal cell 100-3, and the fourth liquid crystal cell 100-4 in this order and is emitted from the optical element 10.

Two adjacent liquid crystal cells 100 of the plurality of liquid crystal cells 100 are bonded to each other via an optical elastic resin layer 160. For example, an adhesive containing a translucent acrylic resin or epoxy resin can be used for the optical elastic resin layer 160.

Unlike a general liquid crystal element used in a liquid crystal display device, the optical element 10 does not require providing a pair of polarizing plates on the front and back surfaces of the optical element 10. In addition, although four liquid crystal cells 100 are shown in FIG. 2, the number of liquid crystal cells 100 included in the optical element 10 is not limited to four. The number of liquid crystal cells 100 included in the optical element 10 may be greater than or equal to five. However, it is preferable that the optical element 10 has four liquid crystal cells 100 stacked repeatedly as a set.

Figure 3A:
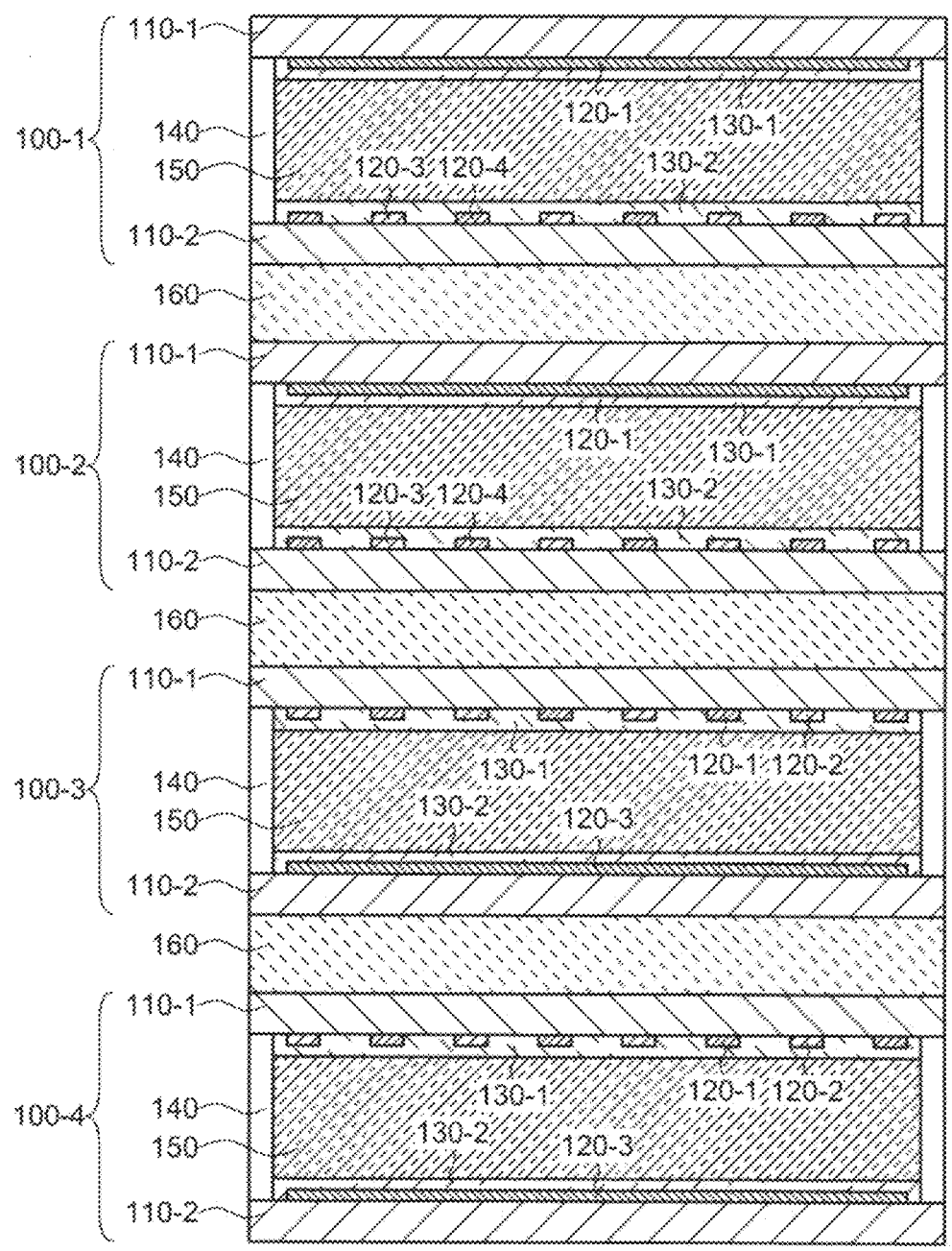
FIG. 3A is a schematic cross-sectional view of an optical element of a lighting device according to an embodiment of the present invention.
Figure 3B:
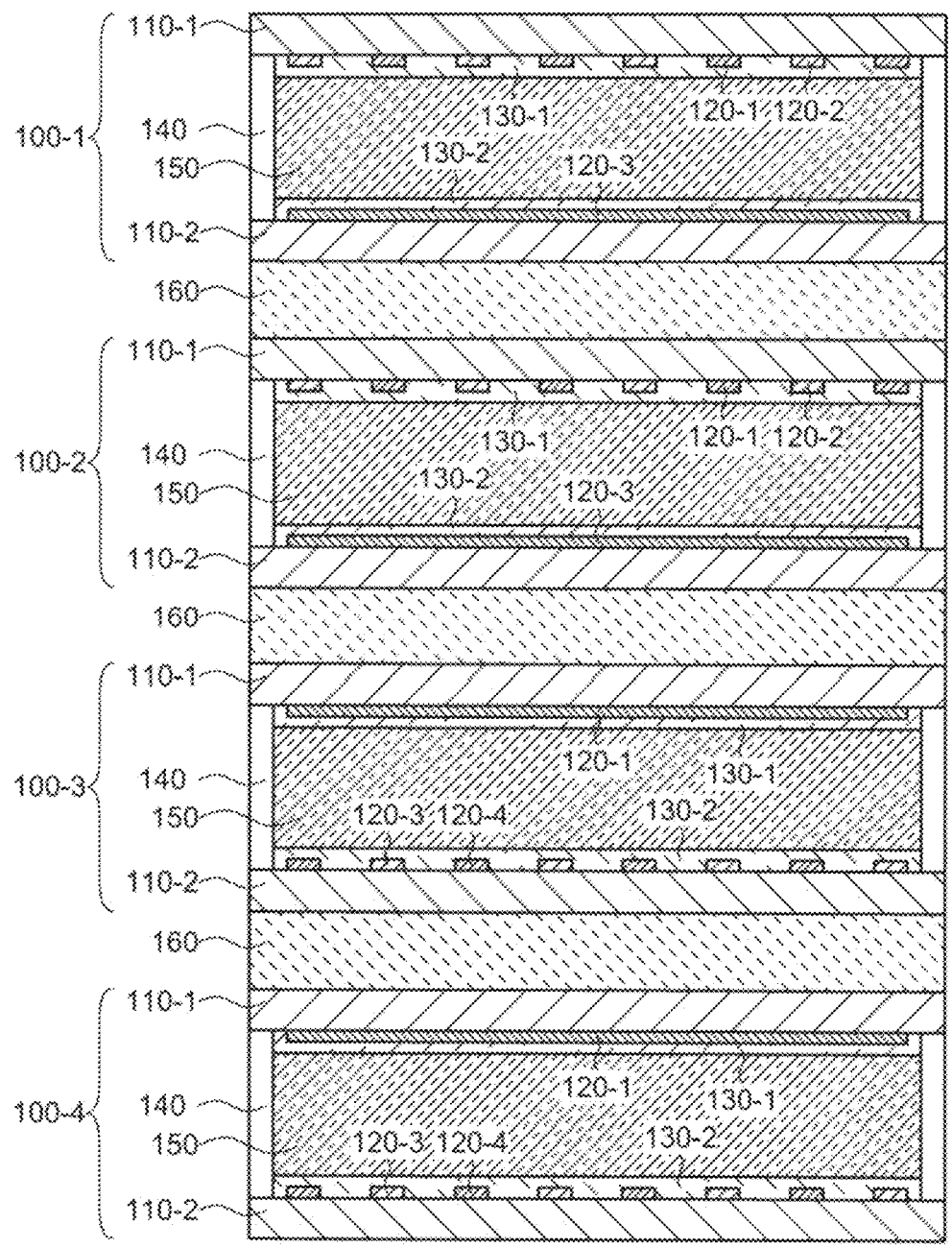
FIG. 3B is a schematic cross-sectional view of an optical element of a lighting device according to an embodiment of the present invention.

FIGS. 3A and 3B are schematic cross-sectional views of the optical element 10 of the lighting device 1 according to an embodiment of the present invention. Specifically, FIG. 3A is a schematic cross-sectional view in a zx plane cut along the line A1-A2 shown in FIG. 2, and FIG. 3B is a schematic cross-sectional view in a yz plane cut along the line B1-B2 shown in FIG. 2. In addition, hereinafter, an x-axis direction and a y-axis direction may be described as a first direction and a second direction, respectively. That is, the second direction is a direction orthogonal to the first direction.

As shown in FIGS. 3A and 3B, each of the plurality of liquid crystal cells 100 includes a first substrate 110-1, a second substrate 110-2, a first transparent electrode 120-1, a second transparent electrode 120-2, a third transparent electrode 120-3, a fourth transparent electrode 120-4, a first alignment film 130-1, a second alignment film 130-2, a sealing member 140, and a liquid crystal layer 150. The first transparent electrode 120-1, the second transparent electrode 120-2, and the first alignment film 130-1 covering the first transparent electrode 120-1 and the second transparent electrode 120-2 are provided on the first substrate 110-1. Further, the third transparent electrode 120-3, the fourth transparent electrode 120-4, and the second alignment film 130-2 covering the third transparent electrode 120-3 and the fourth transparent electrode 120-4 are provided on the second substrate 110-2. The first substrate 110-1 and the second substrate 110-2 are arranged so that the first transparent electrode 120-1 and the second transparent electrode 120-2 on the first substrate 110-1 and the third transparent electrode 120-3 and the fourth transparent electrode 120-4 on the second substrate 110-2 face each other. Further, the first substrate 110-1 and the second substrate 110-2 are bonded to each other via the sealing member 140 that is provided in the peripheral portion of the first substrate 110-1 and the second substrate 110-2. Furthermore, the liquid crystal layer 150 is provided between the first substrate 110-1 and the second substrate 110-2 by sealing a liquid crystal in a space surrounded by the first substrate 110-1 (more specifically, the first alignment film 130-1), the second substrate 110-2 (more specifically, the second alignment film 130-2), and the sealing member 140.

For example, a rigid substrate having light-transmitting properties such as a glass substrate, a quartz substrate, or a sapphire substrate is used as each of the first substrate 110-1 and the second substrate 110-2. Further, a flexible substrate having light-transmitting properties such as a polyimide resin substrate, an acrylic resin substrate, a siloxane resin substrate, or a fluorine resin substrate can also be used as each of the first substrate 110-1 and the second substrate 110-2.

Each of the first transparent electrode 120-1, the second transparent electrode 120-2, the third transparent electrode 120-3, and the fourth transparent electrode 120-4 functions as an electrode for forming an electric field in the liquid crystal layer 150. For example, a transparent conductive material such as indium tin oxide (ITO) or indium zinc oxide (IZO) is used for each of the first transparent electrode 120-1, the second transparent electrode 120-2, the third transparent electrode 120-3, and the fourth transparent electrode 120-4.

The liquid crystal layer 150 can refract transmitted light or change a polarization state of the transmitted light according to an alignment state of the liquid crystal molecules. For example, nematic liquid crystals can be used as the liquid crystal of the liquid crystal layer 150. Although a positive liquid crystal is described as the liquid crystal in the present embodiment, a negative liquid crystal can also be adopted by changing the initial alignment directions of the liquid crystal molecules. Further, the liquid crystal preferably contains a chiral agent that imparts twist to the liquid crystal molecules.

Each of the first alignment film 130-1 and the second alignment film 130-2 aligns the liquid crystal molecules in the liquid crystal layer 150 in a predetermined direction. For example, a polyimide resin or the like can be used for each of the first alignment film 130-1 and the second alignment film 130-2. In addition, each of the first alignment film 130-1 and the second alignment film 130-2 may be imparted with an alignment property by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the sealing member 140. The adhesive material may be of an ultraviolet curable type or a heat curable type.

Here, extending directions of the transparent electrodes 120 and alignment properties of the alignment films 130 are described.

In each of the first liquid crystal cell 100-1, the second liquid crystal cell 100-2, the third liquid crystal cell 100-3, and the fourth liquid crystal cell 100-4, the first transparent electrodes 120-1 and the second transparent electrodes 120-2 are alternately arranged to have a comb-tooth shape. Further, the third transparent electrodes 120-3 and the fourth transparent electrodes 120-4 are also alternately arranged to have a comb-tooth shape.

The third liquid crystal cell 100-3 and the fourth liquid crystal cell 100-4 are stacked on the first liquid crystal cell 100-1 and the second liquid crystal cell 100-2 in a state rotated 90 degrees. That is, the extending directions of the transparent electrodes 120 are different between the first liquid crystal cell 100-1 or the second liquid crystal cell 100-2 and the third liquid crystal cell 100-3 or the fourth liquid crystal cell 100-4. Specifically, in each of the first liquid crystal cell 100-1 and the second liquid crystal cell 100-2, the first transparent electrode 120-1 and the second transparent electrode 120-2 extend in the x-axis direction, and the third transparent electrode 120-3 and the fourth transparent electrode 120-4 extend in the y-axis direction. On the other hand, in each of the third liquid crystal cell 100-3 and the fourth liquid crystal cell 100-4, the first transparent electrode 120-1 and the second transparent electrode 120-2 extend in the y-axis direction, and the third transparent electrode 120-3 and the fourth transparent electrode 120-4 extend in the x-axis direction.

In addition, although the extending direction of the first transparent electrode 120-1 and the second transparent electrode 120-2 is orthogonal to the extending direction of the third transparent electrode 120-3 and the fourth transparent electrode 120-4, the case where the angles deviate from an orthogonal direction by about ±10 degrees may also be described as orthogonal in the present specification.

In each of the first liquid crystal cell 100-1 and the second liquid crystal cell 100-2, the first alignment film 130-1 has an alignment property of aligning the long axes of the liquid crystal molecules in the y-axis direction, and the second alignment film 130-2 has an alignment property of aligning the long axes of the liquid crystal molecules in the x-axis direction. For example, in order to impart such alignment properties to the alignment film 130, a rubbing treatment is performed on the first alignment film 130-1 in the y-axis direction and a rubbing treatment is performed on the second alignment film 130-2 in the x-axis direction. On the other hand, in each of the third liquid crystal cell 100-3 and the fourth liquid crystal cell 100-4, the first alignment film 130-1 has an alignment property of aligning the long axes of the liquid crystal molecules in the x-axis direction, and the second alignment film 130-2 has an alignment property of aligning the long axes of the liquid crystal molecules in the y-axis direction. For example, in order to impart such alignment properties to the alignment film 130, a rubbing treatment is performed on the first alignment film 130-1 in the x-axis direction, and a rubbing treatment is performed on the second alignment film 130-2 in the y-axis direction. In addition, the alignment directions can also be imparted to the first alignment film 130-1 and the second alignment film 130-2 by a photo-alignment treatment.

As described above, although the first liquid crystal cell 100-1, the second liquid crystal cell 100-2, the third liquid crystal cell 100-3, and the fourth liquid crystal cell 100-4 have the transparent electrodes 120 with different extending directions and the alignment films 130 with different alignment directions, the first liquid crystal cell 100-1, the second liquid crystal cell 100-2, the third liquid crystal cell 100-3, and the fourth liquid crystal cell 100-4 have the same basic structure. Here, the properties of light transmitted through the liquid crystal cell 100 are described with reference to FIGS. 4A and 4B.

Figure 4A:
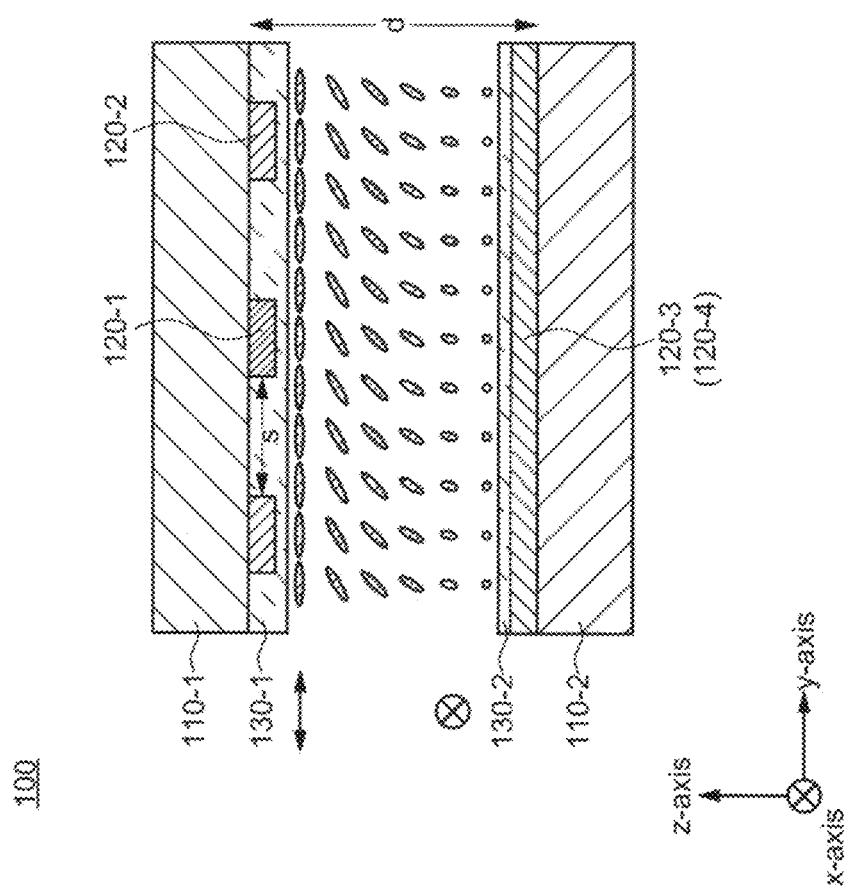
FIG. 4A is a schematic cross-sectional view illustrating alignment directions of liquid crystal molecules in a liquid crystal layer of a liquid crystal cell and properties of light transmitting through the liquid crystal cell in an optical element of a lighting device according to an embodiment of the present invention.
Figure 4B:
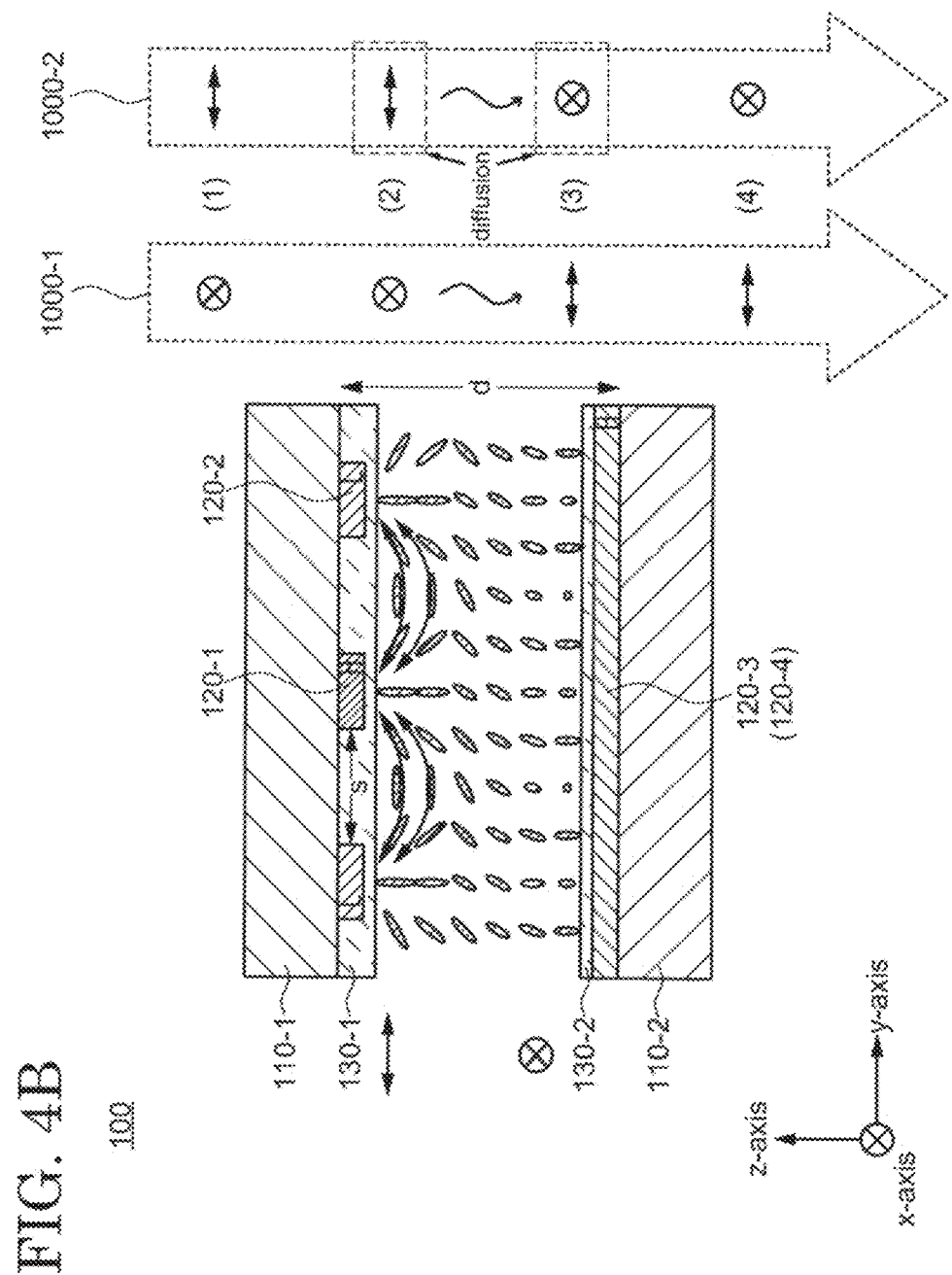
FIG. 4B is a schematic cross-sectional view illustrating alignment directions of liquid crystal molecules in a liquid crystal layer of a liquid crystal cell and properties of light transmitting through the liquid crystal cell in an optical element of a lighting device according to an embodiment of the present invention.

FIGS. 4A and 4B are schematic cross-sectional views illustrating alignment directions of liquid crystal molecules in the liquid crystal layer 150 of the liquid crystal cell 100 and properties of light transmitting through the liquid crystal cell 100 in the optical element 10 of the lighting device 1 according to an embodiment of the present invention. Specifically, FIG. 4A shows the liquid crystal cell 100 in a state where no voltages are applied to the transparent electrodes 120, and FIG. 4B shows the liquid crystal cell 100 in a state where voltages are applied to the transparent electrodes 120.

FIG. 4A shows the liquid crystal cell 100 in a state where no voltages are applied to the transparent electrodes 120. As shown in FIG. 4A, the liquid crystal molecules on the first alignment film 130-1 are aligned with their long axes along the y-axis direction. In other words, the alignment direction of the liquid crystal molecules closer to the first substrate 110-1 is the y-axis direction. On the other hand, the liquid crystal molecules on the second alignment film 130-2 are aligned with their long axes along the x-axis direction. In other words, the alignment direction of the liquid crystal molecules closer to the second substrate 110-2 is the x-axis direction. Therefore, the liquid crystal molecules in the liquid crystal layer 150 are aligned so as to be twisted by 90 degrees in the z-axis direction as the liquid crystal molecules move from the first substrate 110-1 to the second substrate 110-2. In this case, the polarization plane (the polarization axis or the direction of the polarization component) of the light transmitting through the liquid crystal layer 150 is rotated by 90 degrees according to the alignment direction of the liquid crystal molecules. That is, the light transmitting through the liquid crystal layer 150 has optical rotation.

FIG. 4B shows the liquid crystal cell 100 in a state where voltages are applied to the transparent electrodes 120. For example, a high voltage (H) is applied to the first transparent electrode 120-1 and the third transparent electrode 120-3, and a low voltage (L) is applied to the second transparent electrode 120-2 and the fourth transparent electrode 120-4. That is, voltages are applied so that a potential difference is generated between two adjacent transparent electrodes 120. In addition, hereinafter, the electric field generated between two adjacent transparent electrodes 120 may be referred to as a lateral electric field.

The liquid crystal molecules closer to the first substrate 110-1 are aligned in a convex arc shape along the y-axis direction with respect to the first substrate 110-1 by the influence of the lateral electric field between the first transparent electrode 120-1 and the second transparent electrode 120-2. Further, the liquid crystal molecules closer to the second substrate 110-2 are aligned in a convex arc shape along the x-axis direction with respect to the second substrate 110-2 by the influence of the lateral electric field between the third transparent electrode 120-3 and the fourth transparent electrode 120-4. In contrast, since the cell gap d (20 $\mu m \leq d \leq 50$ $\mu m$), which is the distance between the first substrate 110-1 and the second substrate 110-2, is sufficiently large compared to the distance s (3 $\mu m \leq s \leq 15$ $\mu m$) between the adjacent transparent electrodes 120 on the substrate, the liquid crystal molecules in the center between the first substrate 110-1 and the second substrate 110-2 are hardly changed from the initial alignment by any lateral electric field. In addition, as described above, since the first substrate 110-1 and the second substrate 110-2 are sufficiently far apart, the lateral electric field between the first transparent electrode 120-1 and the second transparent electrode 120-2 on the first substrate 110-1 does not affect the alignment of the liquid crystal molecules on the side of the second substrate 110-2, or is negligibly small. Similarly, the lateral electric field between the third transparent electrode 120-3 and the fourth transparent electrode 120-4 on the second substrate 110-2 does not affect the alignment of the liquid crystal molecules on the side of the first substrate 110-1, or is negligibly small.

Light irradiated from the light source has a polarization component in the x-axis direction (hereinafter, referred to as "P-polarization component") and a polarization component in the y-axis direction (hereinafter, referred to as "S-polarization component"). However, for convenience, the polarization component of the light is divided into the P-polarization component and the S-polarization component in the following description. That is, the light irradiated from the light source includes a first polarized light 1000-1 having the P-polarization component and a second polarized light 1000-2 having the S-polarization component (see (1) in FIG. 4B).

In FIG. 4B, since the P-polarization component of the first polarized light 1000-1 incident on the liquid crystal cell 100 is different from the alignment direction of the liquid crystal molecules on the side of the first substrate 110-1, the first polarized light 1000-1 is not diffused (see (2) in FIG. 4B). When the first polarized light 1000-1 travels from the first substrate 110-1 to the second substrate 110-2, the first polarized light 1000-1 undergoes optical rotation in the process of being transmitted through the liquid crystal layer 150, and its polarization component changes from the P-polarization component to the S-polarization component. Since the S-polarization component of the first polarized light 1000-1 is different from the alignment direction of the liquid crystal molecules on the side of the second substrate 110-2, the first polarized light 1000-1 is not diffused (see (3) in FIG. 4B). Further, the first polarized light 1000-1 emitted from the liquid crystal cell 100 has the S-polarization component (see (4) in FIG. 4B).

On the other hand, since the S-polarization component of the second polarized light 1000-2 incident on the liquid crystal cell 100 is the same as the alignment direction of the liquid crystal molecules on the side of the first substrate 110-1, the second polarized light 1000-2 is diffused in the y-axis direction according to the refractive index distribution of the liquid crystal molecules on the side of the first substrate 110-1 (see (2) in FIG. 4B). When the second polarized light 1000-2 travels from the first substrate 110-1 to the second substrate 110-2, the second polarized light 1000-2 undergoes optical rotation in the process of being transmitted through the liquid crystal layer 150, and its polarization component changes from the S-polarization component to the P-polarization component. Since the P-polarization component of the second polarized light 1000-2 is the same as the alignment direction of the liquid crystal molecules on the side of the second substrate 110-2, the second polarized light 1000-2 is diffused in the x-axis direction according to the refractive index distribution of the liquid crystal molecules on the side of the second substrate 110-2 (see (3) in FIG. 4B). Further, the second polarized light 1000-2 emitted from the liquid crystal cell 100 has the P-polarization component (see (4) in FIG. 4B).

As can be seen from the above description, light can be diffused in a predetermined direction by using the direction of the lateral electric field generated by the transparent electrodes 120 and the optical rotation and the refractive index distribution of the liquid crystal molecules in the liquid crystal cell 100. In the optical element 10, it is possible to control the diffusion of light transmitting through each liquid crystal cell 100 by using the plurality of the liquid crystal cells 100 to form various light distribution shapes. In addition, the light distribution shapes can also be controlled by the magnitude of the voltage applied to the transparent electrode 120.

[3. Configuration of Light Source 20]

Figure 5:
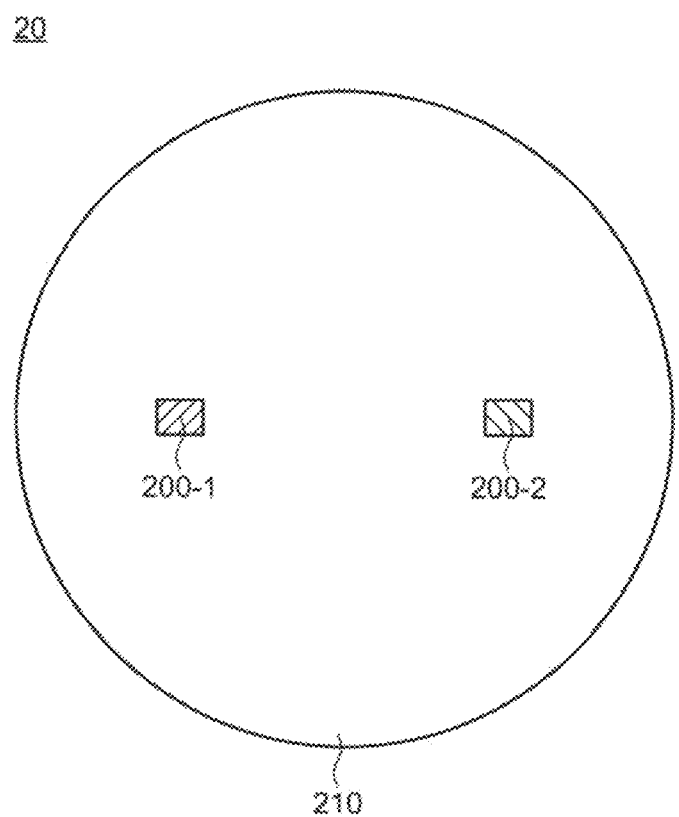
FIG. 5 is a schematic plan view of a light source of a lighting device according to an embodiment of the present invention.

FIG. 5 is a schematic plan view of the light source 20 of the lighting device 1 according to an embodiment of the present invention. The light source 20 includes a first light emitting element 200-1, a second light emitting element 200-2, and a circuit board 210. The first light emitting element 200-1 and the second light emitting element 200-2 are mounted on the circuit board 210 or directly formed thereon. The first light emitting element 200-1 and the second light emitting element 200-2 are arranged symmetrically. For example, when the circuit board 210 has a circular shape with a diameter of 10 cm, the first light emitting element 200-1 and the second light emitting element 200-2 are arranged along the center line of the circuit board 210 so that the distance between the first light emitting element 200-1 and the second light emitting element 200-2 is 5 cm. The circuit board 210 may have not only a circular shape but also a rectangular shape.

The first light emitting element 200-1 and the second light emitting element 200-2 are light emitting elements with different color temperatures. Specifically, the color temperature of the light emitted from the first light emitting element 200-1 is different from the color temperature of the light emitted from the second light emitting element 200-2. The light irradiated from the light source 20 is a composite light of the light emitted from the first light emitting element 200-1 and the light emitted from the second light emitting element 200-2. For example, when the first light emitting element 200-1 and the second light emitting element 200-2 have color temperatures of 2000K and 6500K, respectively, the color temperature of the light irradiated from the light source 20 can be adjusted to 4000K. In addition, the color temperature of each of the first light emitting element 200-1 and the second light emitting element 200-2 is not limited thereto.

For example, although each of the first light emitting element 200-1 and the second light emitting element 200-2 is an LED, the first light emitting element 200-1 and the second light emitting element 200-2 are not limited thereto.

In addition, since the light emitted from each of the first light emitting element 200-1 and the second light emitting element 200-2 is reflected countless times by the reflector 30, they are mixed equally over the surface direction of the optical element 10 when they enter the optical element 10. In other words, the light incident on the optical element 10 has the same or substantially the same brightness and color (color temperature) over the surface direction of the optical element 10, similar to the light emitted from a surface of a light source. In order to promote such an effect, a configuration in which one or more diffusion plates are interposed between the light emitting element 200 and the optical element 10, or a configuration in which a protrusion or a curved surface having a parabolic cross section is provided on the reflector 30 can also be applied.

The arrangement of the first light emitting element 200-1 and the second light emitting element 200-2 arranged on the circuit board 210 is not limited to the arrangement shown in FIG. 5. Here, several examples of the arrangement of the light emitting elements 200 are described with reference to FIGS. 6A to 6E.

FIGS. 6A to 6E are schematic plan views showing the arrangement of light emitting elements 200 of light sources 20A to 20E of the lighting device 1 according to an embodiment of the present invention.

Figure 6A:
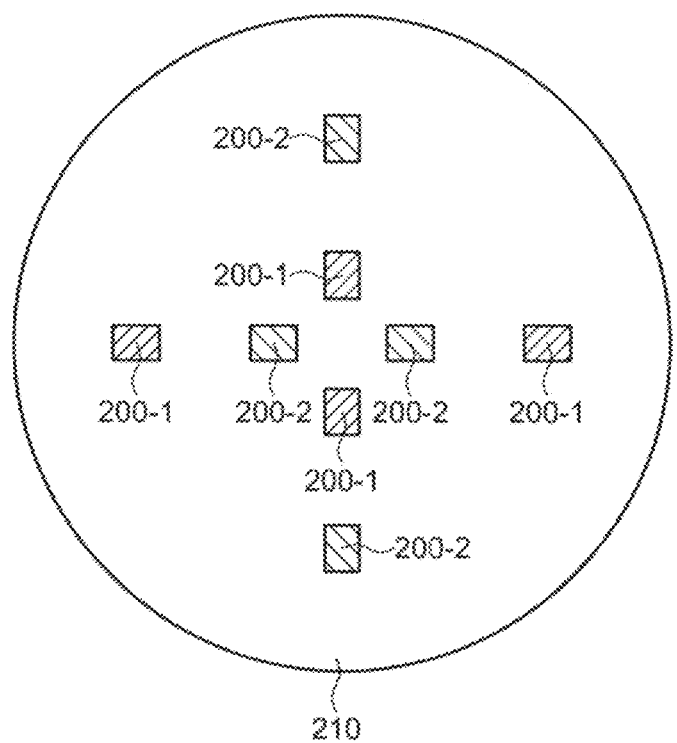
FIG. 6A is a schematic plan view showing an arrangement of light emitting elements of a light source of a lighting device according to an embodiment of the present invention.
Figure 6B:
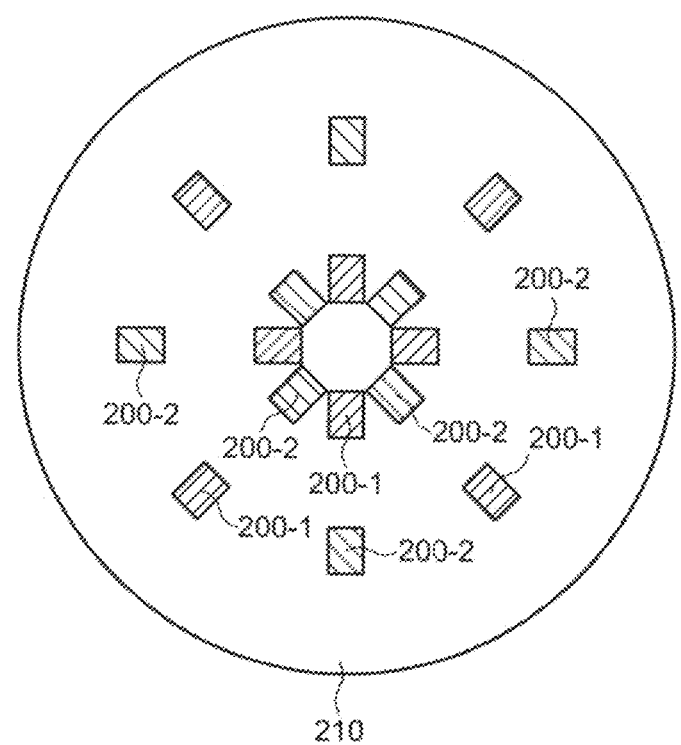
FIG. 6B is a schematic plan view showing an arrangement of light emitting elements of a light source of a lighting device according to an embodiment of the present invention.
Figure 6C:
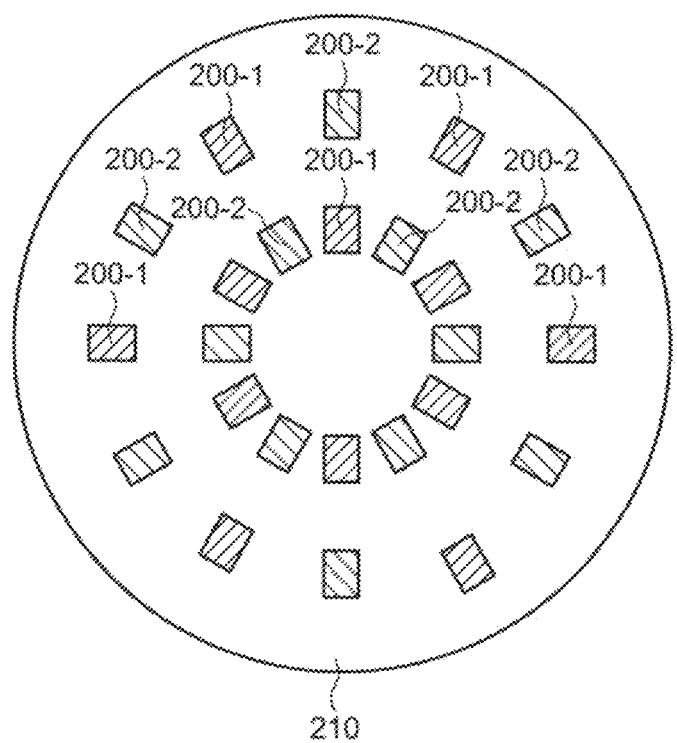
FIG. 6C is a schematic plan view showing an arrangement of light emitting elements of a light source of a lighting device according to an embodiment of the present invention.

As shown in FIGS. 6A to 6C, a plurality of first light emitting elements 200-1 and a plurality of second light emitting elements 200-2 may be arranged on the circuit board 210. In the light source 20A shown in FIG. 6A, the first light emitting elements 200-1 and the second light emitting elements 200-2 are alternately arranged radially in four directions from the center of the circuit board 210 toward the periphery. In other words, the first light emitting elements 200-1 and the second light emitting elements 200-2 are arranged in a cross shape. In the light source 20B shown in FIG. 6B, the first light emitting elements 200-1 and the second light emitting elements 200-2 are alternately arranged radially in eight directions from the center of the circuit board 210 toward the periphery. In the light source 20C shown in FIG. 6C, the first light emitting elements 200-1 and the second light emitting elements 200-2 are alternately arranged radially in 12 directions from the center of the circuit board 210 toward the periphery. In addition, the types of two adjacent light emitting elements on a concentric circle are different in each of the light sources 20A to 20C. In the light sources 20A to 20C, the color temperature in the plane of the light source 20 can be made uniform by symmetrically arranging the plurality of first light emitting elements 200-1 and the plurality of second light emitting elements 200-2.

Figure 6D:
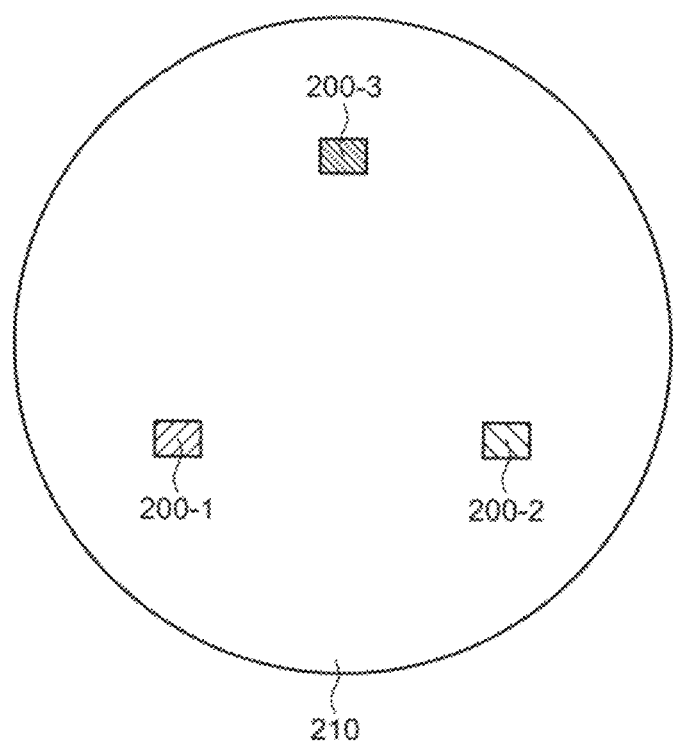
FIG. 6D is a schematic plan view showing an arrangement of light emitting elements of a light source of a lighting device according to an embodiment of the present invention.
Figure 6E:
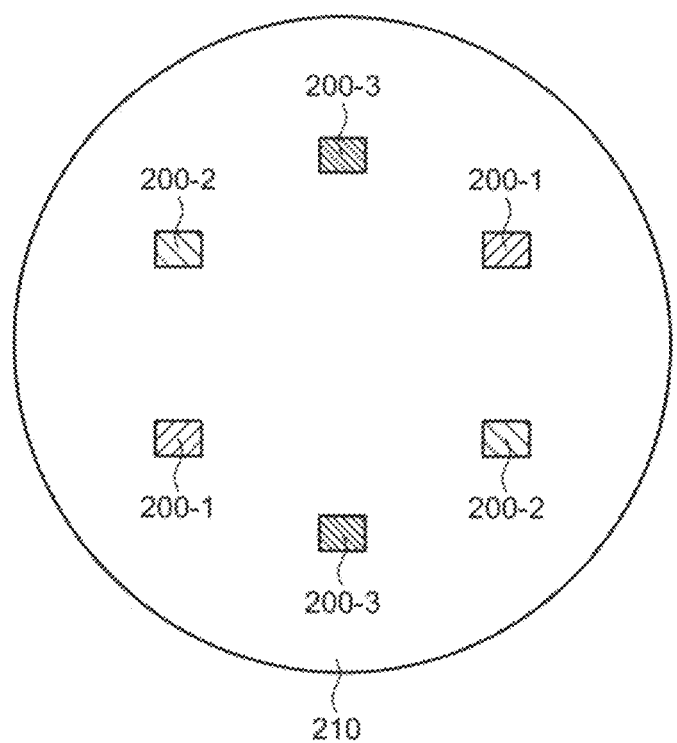
FIG. 6E is a schematic plan view showing an arrangement of light emitting elements of a light source of a lighting device according to an embodiment of the present invention.

As shown in FIGS. 6D and 6E, three types of light emitting elements 200 may be arranged on the circuit board 210. For example, light emitting elements emitting incandescent light (color temperature 3000K), neutral white light (color temperature 5000K), and daylight light (color temperature 6500K) may be used as the first light emitting element 200-1, the second light emitting element 200-2, and the third light emitting element 200-3, respectively. Further, light emitting elements emitting red light, green light, and blue light may be used as the first light emitting element 200-1, the second light emitting element 200-2, and the third light emitting element 200-3, respectively.

In the light source 20D shown in FIG. 6D, the first light emitting element 200-1, the second light emitting element 200-2, and the third light emitting element 200-3 are arranged to form an equilateral triangular shape. In the light source 20E shown in FIG. 6E, the first light emitting element 200-1, the second light emitting element 200-2, and the third light emitting element 200-3 are arranged to form a regular hexagonal shape. In addition, the types of two adjacent light emitting elements 200 in a polygonal shape are different in both the light source 20D and the light source 20E. In the light source 20D and the light source 20E, three types of light emitting elements 200 (for example, three types with different emission colors) are arranged, so that the color temperature in the plane of the light source 20 can be made uniform.

[4. Configuration of Control Unit 40]

Figure 7:
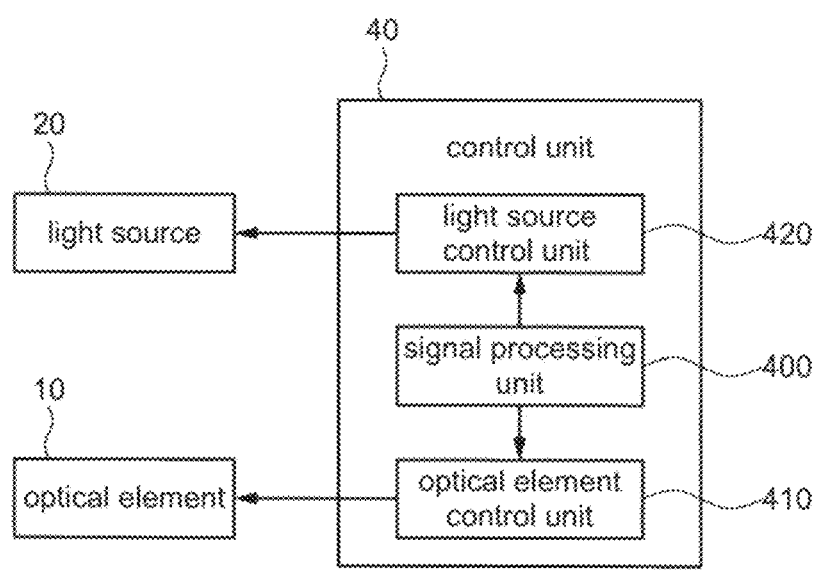
FIG. 7 is a block diagram showing a configuration of a control unit of a lighting device according to an embodiment of the present invention.

FIG. 7 is a block diagram showing a configuration of the control unit 40 of the lighting device 1 according to an embodiment of the present invention. The control unit 40 includes a signal processing unit 400, an optical element control unit 410, and a light source control unit 420.

The signal processing unit 400 receives a control signal that controls the light distribution of the lighting device 1, and generates an optical element control signal that controls the optical element 10 and a light source control signal that controls the light source 20. The signal processing unit 400 is communicatively connected to the optical element control unit 410 and the light source control unit 420, and can transmit the optical element control signal and the light source control signal to the optical element control unit 410 and the light source control unit 420, respectively.

The optical element control unit 410 controls the optical element 10 based on the optical element control signal. Specifically, the optical element control unit 410 applies voltages to the transparent electrodes 120 of each liquid crystal cell 100 of the optical element 10 based on the optical element control signal. Thus, it is possible to control the distribution of light irradiated from the light source 20. In addition, although various voltages are applied to the transparent electrodes 120 of each liquid crystal cell 100 of the optical element 10 according to the light distribution shape, it is described in the following description that voltages are applied to the transparent electrodes on the same substrate 110 so as to be the same potential difference between all adjacent transparent electrodes (the first transparent electrode 120-1 and the second transparent electrode 120-2 or the third transparent electrode 120-3 and the fourth transparent electrode 120-4) in each liquid crystal cell 100 of the optical element 10, for the sake of convenience. Here, the voltages are described as "a voltage applied to the optical element 10". In this case, the distribution of light diffused by the optical element 10 is in a state in which the light incident on the optical element 10 from the light source 20 is isotropically diffused in the x-axis direction and the y-axis direction. In contrast, when potential differences are only between the adjacent transparent electrodes 120 on the side of the first substrate 110-1 of the first liquid crystal cell 100-1, between the adjacent transparent electrodes 120 on the side of the first substrate 110-1 of the second liquid crystal cell 100-2, between the adjacent transparent electrodes 120 on the side of the second substrate 110-2 of the third liquid crystal cell 100-3, and between the adjacent transparent electrode 120 on the side of the second substrate 110-2 of the fourth liquid crystal cell 100-4, a light distribution that is longer in the y-axis direction than in the x-axis direction is formed. Further, when potential differences are only between the adjacent transparent electrodes 120 on the side of the second substrate 110-2 of the first liquid crystal cell 100-1, between the adjacent transparent electrodes 120 on the side of the second substrate 110-2 of the second liquid crystal cell 100-2, between the adjacent transparent electrodes 120 on the side of the first substrate 110-1 of the third liquid crystal cell 100-3, and between the adjacent transparent electrode 120 on the side of the first substrate 110-1 of the fourth liquid crystal cell 100-4, a light distribution that is longer in the x-axis direction than in the y-axis direction is formed.

The light source control unit 420 controls the light source 20 based on the light source control signal. Specifically, the light source control unit 420 adjusts the light emission time in one period of each of the first light emitting element 200-1 and the second light emitting element 200-2 of the light source 20 in response to the voltage applied to the optical element 10, and controls the color temperature of the light irradiated from the light source 20. That is, in the lighting device 1, the color temperature of the light irradiated from the light source 20 can be changed. Thus, even when the light distribution angle is controlled by the optical element 10, the color temperature of the light emitted from the direction perpendicular to the surface of the optical element 10 can be kept constant.

The control of the light source 20 of the lighting device 1 is described in further detail with reference to Table 1.

The signal processing unit 400 includes a lookup table related to the control of the optical element 10 and the control of the light source 20 in Table 1. The lookup table may be stored in the memory of the signal processing unit 400. In the lookup table, the voltage applied to the optical element 10 is associated with the first light emission time of the first light emitting element 200-1 and the second light emission time of the second light emitting element 200-2. That is, when the voltage applied to the optical element 10 for controlling the light distribution angle is determined, the first light emission time of the first light emitting element 200-1 and the second light emission time of the second light emitting element 200-2 are also determined. Therefore, the signal processing unit 400 can refer to the lookup table and generate an optical element control signal including a voltage applied to the optical element 10 and a light source control signal including the first light emission time and the second light emission time.

TABLE 1

| control of optical element | | amount of change | control of light source | | amount of change | | |
|---|---|---|---|---|---|---|---|
| light distribution angle (degree) | voltage (V) | in chromaticity coordinate before controlling light source (Δx, Δy) | first light emission time (%) | second light emission time (%) | in chromaticity coordinate after controlling light source (Δx, Δy) | color temperature (K) | relative front brightness |
| 2 (off) | 0 | (0.000, 0.000) | 20 | 20 | (0.000, 0.000) | 4000 | 100 |
| 2 | 2.5 | (+0.013, +0.015) | 21 | 24 | (0.000, 0.000) | 4000 | 100 |
| 30 | 5.0 | (+0.025, +0.007) | 80 | 100 | (0.000, 0.000) | 4000 | 10 |
| 35 | 7.5 | (−0.014, +0.005) | 100 | 80 | (0.000, 0.000) | 4000 | 2 |
| 40 | 10 | (−0.023, −0.020) | 100 | 55 | (0.000, 0.000) | 4000 | 1 |
| 45 | 15 | (−0.030, −0.047) | 100 | 25 | (0.000, 0.000) | 4000 | 1 |

In addition, the "light distribution angle" in the column "control of optical element" in Table 1 is twice the angle between a line, which connects the light source 20 to a point where the brightness of the emitted light is 50% of the front brightness when the optical element 10 is viewed from a certain point on an X-axis in a certain plane (XY plane) parallel to the emission surface of the optical element 10, and a normal line from the plane to the light source 20. Further, the "voltage" in the column "control of optical element" is a potential difference applied between two adjacent transparent electrodes 120 of each liquid crystal cell 100. The light distribution angle in the left column is obtained by maintaining the potential difference. Furthermore, the "amount of change in chromaticity coordinates before controlling light source" is an amount of change in the chromaticity coordinates of the light emitted from the optical element 10 when the voltage in the column "control of optical element" is applied between the transparent electrodes 120 of each liquid crystal cell 100 of the optical element 10. The amount of change here is the amount of change from the chromaticity coordinates obtained when the voltage is 0 V, and is converted by chromaticity coordinates obtained when the voltage is 0 V as (0.0000, 0.0000). The "first light emission time" in the column "control of light source" is the proportion of the application time of the on-voltage of the first light emitting element 200-1 driven by PWM. The same configuration is applied to the "second light emission time". Specifically, a light emission time of 20% indicates that the proportion of the application time of the on-voltage in one frame period is 20%, and a light emission time of 100% indicates that the on-voltage is applied over one frame period. The "amount of change in chromaticity coordinates after controlling light source" is an amount of change in chromaticity coordinates of light emitted from the optical element 10 when the voltage in the column "control of optical element" is applied between the transparent electrodes 120 of each liquid crystal cell 100 of the optical element 10 and the first light emitting element 200-1 and the second light emitting element 200-2 are controlled using the first light emission time and the second light emission time in the column "control of light source". The amount of change here is the amount of change from the chromaticity coordinates obtained when the voltage is 0 V, and is converted by the chromaticity coordinates obtained when the voltage is 0 V as (0.0000, 0.0000). The "color temperature" is a color temperature of light emitted from the optical element 10 after controlling the light source 20. The "relative front brightness" is a brightness of the front (the position in the normal direction in the plane, hereinafter, may be referred to as the center position) of the light source 20, and is a numerical value relatively expressed when the voltage in the "control of optical element" is 0 V for 100.

Although the light distribution angle is 2 degrees when the voltage applied to the optical element 10 is 0 V in Table 1, this is because the light incident on the optical element 10 has the light distribution angle of 2 degrees. That is, even when the optical element 10 is off, the distribution angle of the light emitted from the optical element 10 is 2 degrees when the light source 20 is on. Further, the first light emitting element 200-1 and the second light emitting element 200-2 are LEDs having color temperatures of 2000 K and 6500 K, respectively. In Table 1, the ratios of the light emission time in one period are shown as the first light emission time of the first light emitting element 200-1 and the second light emission time of the second light emitting element 200-2. In addition, the control of the light source 20 may be performed by adjusting the voltage supplied to the light emitting element 200 (such as the ratio to the maximum voltage), instead of the light emission time of the light emitting element 200. Further, the lookup table shown in Table 1 is an example, and the signal processing unit 400 may include a lookup table corresponding to the characteristics of the optical element 10 or the light source 20.

The optical element control signal and the light source control signal generated by the signal processing unit 400 are respectively transmitted to the optical element control unit 410 and the light source control unit 420. The optical element control unit 410 controls the optical element 10 based on the optical element control signal. Further, the light source control unit 420 controls the light source 20 based on the light source control signal.

As shown in Table 1, when only the optical element 10 of the lighting device 1 is controlled and the light source 20 is not controlled (see "amount of change in chromaticity coordinates before controlling light source" in Table 1), the chromaticity coordinates changes with the change in the light distribution angle. Here, the amount of change in chromaticity coordinates is a value that represents the amount of change from the reference chromaticity coordinates when the optical element 10 is off. More specifically, when the optical element 10 is off (when the voltage is 0 V in the column "controlling optical element"), no voltage is applied to any of the transparent electrodes 120 of the optical element 10. Therefore, the light irradiated from the light source 20 is emitted from the optical element 10 without being diffused by the optical element 10, and the chromaticity coordinates of the light emitted from the optical element in this state is a reference (the amount of change in chromaticity coordinates in this state is (0.000, 0.000)). Further, when the optical element 10 is on (when the voltage is other than 0V in the column "controlling optical element"), the light irradiated from the light source 20 is diffused by applying voltages to the transparent electrodes 120 of the optical element 10, which causes a change of the chromaticity of the emitted light. That is, in Table 1, when the amount of change in chromaticity coordinates is (0.000, 0.000), light having the same chromaticity coordinates as the reference is emitted from the lighting device 1. On the other hand, when the amount of change in chromaticity coordinates is a value other than (0.000, 0.000), it indicates that the color of the emitted light is changed from chromaticity coordinates of the reference due to the influence of diffusion in the optical element 10. In the present embodiment, the ratio of brightness of the plurality of light emitting elements 200 in the light source 20 is changed in order to suppress the change in the chromaticity of the emitted light due to the influence of diffusion in the optical element 10.

Further, Table 1 shows the optical properties of not only the optical element 10 but also the light emitted from the lighting device 1 in which the light source 20 is controlled. Specifically, Table 1 shows the light distribution angle, the amount of change in chromaticity coordinates, the color temperature, and the relative front brightness as the optical properties. The relative front brightness is the front brightness on the central optical axis of the lighting device 1 (the axis normal to the emission surface and transmitting through the center of the lighting device 1), and is a normalized value with the brightness when the optical element 10 is off as 100. In addition, the amount of change in chromaticity coordinates, the color temperature, and the relative brightness are measured for the light emitted from the direction perpendicular to the surface of the optical element 10.

As shown in Table 1, even when the light distribution angle of the light irradiated from the lighting device 1 changes, the change in the chromaticity coordinates of the light is small, and the color temperature of the light is constant at 4000 K. More specifically, in the lighting device 1, even when the light distribution state (first distribution state) in which the light distribution angle of the light emitted from the optical element 10 is 2 degrees is changed into the light distribution state (second distribution state) in which the light distribution angle is 30 degrees, the color temperature of the emitted light is constant at 4000 K. In this way, the lighting device 1 can emit light with a small change in color temperature by controlling the light source 20 in correspondence with controlling the optical element 10 even when the light distribution angle changes. Further, as shown in Table 1, the front brightness of the light having the maximum light distribution angle (i.e., the brightness of the light irradiated from the lighting device 1 when the maximum voltage is applied to the optical element 10) is $\frac{1}{100}$ of the front brightness of the light having the minimum light distribution angle (i.e., the brightness of the light irradiated from the lighting device 1 when the minimum voltage is applied to the optical element 10). Although this indicates the light emitted from the optical element 10 is diffused to the side by the amount that the front brightness is reduced, the user perceives the light irradiated from the lighting device 1 as dark when the relative brightness of the light having the maximum light distribution angle is less than $\frac{1}{100}$. Therefore, it is preferable that the signal processing unit 400 controls the light source 20 so that the brightness of the light emitted from the optical element 10 when a voltage is applied to the optical element 10 is greater than or equal to $\frac{1}{100}$ and less than or equal to 1 to the brightness of the light emitted from the optical element 10 when no voltage is applied to the optical element 10.

The details of Table 1 are further described. When the voltage between the adjacent transparent electrodes 120 of each liquid crystal cell 100 is 2.5 V, the alignment state of the liquid crystal molecules in the liquid crystal layer 150 changes slightly. In this case, although the transmitted light does not diffuse, the chromaticity of the transmitted light changes due to the change in the alignment state (see the first and second rows of Table 1). In the present embodiment, the light emission time of each light emitting element 200 is changed to suppress this effect. More specifically, the first light emission time of the first light emitting element 200-1 is increased from 20% (at 0 V) to 21% (at 2.5 V), and the second light emission time of the second light emitting element 200-2 is increased from 20% (at 0 V) to 24% (at 2.5 V). By this method, the change in chromaticity associated with the change in the alignment state of the liquid crystal molecules is corrected. Further, although the brightness also changes (the front brightness becomes darker) with the change in the alignment state of the liquid crystal molecules, the brightness is also compensated for by increasing and adjusting the light emission time.

Further, when the voltage between the adjacent transparent electrodes 120 of each liquid crystal cell 100 is 5.0 V, the light distribution angle becomes large at 30 degrees, while the chromaticity changes (see the third row of Table 1). Even in this case, the change in chromaticity due to the change in the alignment state of the liquid crystal molecules is corrected by setting the first light emission time of the first light emitting element 200-1 to 80% and the second light emitting time of the second light emitting element 200-2 to 100%. In addition, when the light distribution angle becomes large at 30 degrees, the brightness at the center position is significantly reduced accordingly (relative front brightness of 10). However, in the present embodiment, the brightness at the center position is not compensated for, and the reduction in brightness at the center position due to the diffusion of the emitted light is allowed. The same is applied for the fourth to sixth rows of Table 1.

Furthermore, as shown in Table 1, when the voltage applied to each liquid crystal cell 100 of the optical element 10 is low, more specifically, when the applied voltage is greater than 0 V and less than 7.5 V, the second light emission time of the second light emitting element 200-2, which has a relatively low color temperature (at least a lower color temperature than the first light emitting element 200-1), is shorter than the first light emission time of the first light emitting element 200-1, which has a relatively high color temperature. On the other hand, when the voltage applied to each liquid crystal cell 100 of the optical element 10 is high, more specifically, when the applied voltage is greater than or equal to 7.5 V and less than or equal to 15 V, the second light emission time of the second light emitting element 200-2 is longer than the first light emission time of the first light emitting element 200-1. In this way, in the present embodiment, the color temperature of the light finally emitted from the optical element is kept constant, even though the light emission times of the light emitting elements 200 with different color temperatures are switched depending on the magnitude of the applied voltage.

Moreover, in the lighting device 1, the color temperature of the light irradiated from the lighting device 1 can be changed by changing the lookup table included in the signal processing unit 400. Table 2 is an example including a lookup table for changing the color temperature of the light emitted from the lighting device 1.

TABLE 2

| control of optical element | | amount of change | control of light source | | amount of change | | |
|---|---|---|---|---|---|---|---|
| light distribution angle (degree) | voltage (V) | in chromaticity coordinate before controlling light source (Δx, Δy) | first light emission time (%) | second light emission time (%) | in chromaticity coordinate after controlling light source (Δx, Δy) | color temperature (K) | relative front brightness |
| 2 (off) | 0 | (0.000, 0.000) | 20 | 20 | (0.000, 0.000) | 4000 | 100 |
| 2 | 2.5 | (+0.013, +0.015) | 24 | 21 | (0.000, 0.000) | 4000 | 100 |
| 30 | 5.0 | (+0.025, +0.007) | 100 | 80 | (0.000, 0.000) | 4000 | 10 |
| 35 | 7.5 | (−0.014, +0.005) | 100 | 50 | (−0.031, −0.008) | 5000 | 2 |
| 40 | 10 | (−0.023, −0.020) | 100 | 50 | (−0.036, −0.019) | 5200 | 1 |
| 45 | 15 | (−0.030, −0.047) | 100 | 50 | (−0.041, −0.032) | 5400 | 1 |

In Table 2, the second light emission time of the second light emitting element 200-2 is 50% when the voltage applied to the optical element 10 is 7.5 V (light distribution angle of 35 degrees), 10 V (light distribution angle of 40 degrees), and 15 V (light distribution angle of 45 degrees). In this case, the color temperatures of the light irradiated from the lighting device 1 change to 5000 K, 5200 K, and 5400 K at the light distribution angle of 35 degrees, 40 degrees, and 45 degrees, respectively.

More specifically, in Table 2, the color temperature is changed by increasing the voltage applied to each liquid crystal cell 100 of the optical element 10 while keeping the ratio of the first light emission time of the first light emitting element 200-1 and the second light emission time of the second light emitting element 200-2 constant. In other words, Table 2 shows that the color temperature increases. As shown in Tables 1 and 2, in the present embodiment, it is possible to change the color temperature of the emitted light by changing the ratio of the first light emission time and the second light emission time, and it is also possible not to change the color temperature of the emitted light. In this way, in the present embodiment, not only various light distribution states can be formed but also the chromaticity or brightness can be controlled by controlling the light emitting element 200 and the optical element 10.

As described above, the lighting device 1 includes the light source 20 including at least two types of light emitting elements 200 with different color temperatures. The lighting device 1 also includes the optical element 10 and the control unit 40. The control unit 40 can control the light distribution angle of the light emitted from the optical element 10, and can control the color temperature of the light irradiated from the light source 20 in response to the control of the light distribution angle. Therefore, the lighting device 1 can emit light with a small change in color temperature even when the light distribution angle of the light is changed by the optical element 10.

Second Embodiment

A lighting device 1F according to an embodiment of the present invention is described with reference to FIG. 8. In the following, when a configuration of the lighting device 1F is similar to the configuration of the lighting device 1, the description of the configuration of the lighting device 1F may be omitted.

Figure 8:
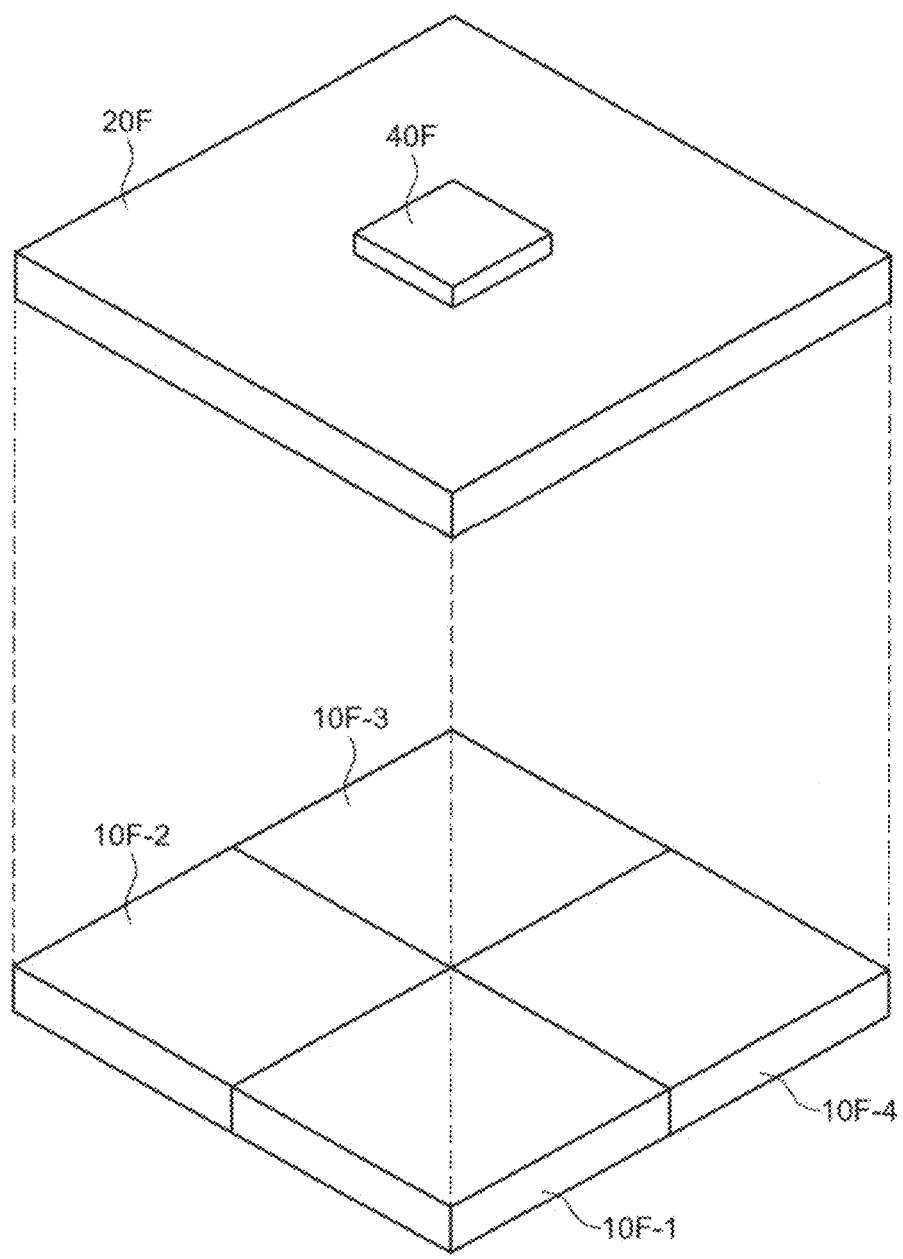
FIG. 8 is a schematic exploded perspective view of a lighting device according to an embodiment of the present invention.

FIG. 8 is a schematic exploded perspective view of the lighting device 1F according to an embodiment of the present invention. As shown in FIG. 8, the lighting device 1F includes a first optical element 10F-1, a second optical element 10F-2, a third optical element 10F-3, a fourth optical element 10F-4, a light source 20F, and a control unit 40F. In other words, the lighting device 1F includes a plurality of optical elements 10F. More specifically, the plurality of optical elements 10F are arranged such that the emission surfaces of the plurality of optical elements 10F are located on the same plane.

The first optical element 10F-1, the second optical element 10F-2, the third optical element 10F-3, and the fourth optical element 10F-4 are arranged so as to form one surface. More specifically, the first optical element 10F-1 to the fourth optical element 10F-4 are arranged so that the emission surfaces of the optical elements 10F are located on the same plane. The light source 20F may be bonded to the plane formed by the plurality of optical elements 10F via an adhesive layer, or may be arranged to face the surface formed by the plurality of optical elements 10F via a reflector (not shown in the figures).

In the lighting device 1F, the control unit 40F can individually control each of the plurality of optical elements 10F. Therefore, the lighting device 1F can irradiate light of various shape patterns by combining the light distribution shapes of the light emitted from the plurality of optical elements 10F. Further, since the control unit 40F controls the color temperature of the light irradiated from the light source 20F, the lighting device 1F can irradiate light with a small change in color temperature.

As described above, in the lighting device 1F, the control unit 40F can control not only the light distribution angle of the light emitted from each of the plurality of optical elements 10F but also the color temperature of the light emitted from the light source 20F corresponding to the control of the light distribution angle. Further, in the lighting device 1F, the light distribution shapes of the light emitted from the plurality of optical elements 10F can be combined to irradiate light of various shape patterns. Therefore, the lighting device 1 can irradiate light with a small change in color temperature even when the shape pattern of the light is changed by the plurality of optical elements 10F.

Third Embodiment

In a lighting device 1 in which the use of the lighting device 1 is limited and a specific light distribution shape is used exclusively, it is effective to arrange the light emitting elements 200 in consideration of the light distribution shape. In the following description, arrangements of the light emitting elements 200 are described with reference to FIGS. 9A to 11F.

Figure 9A:
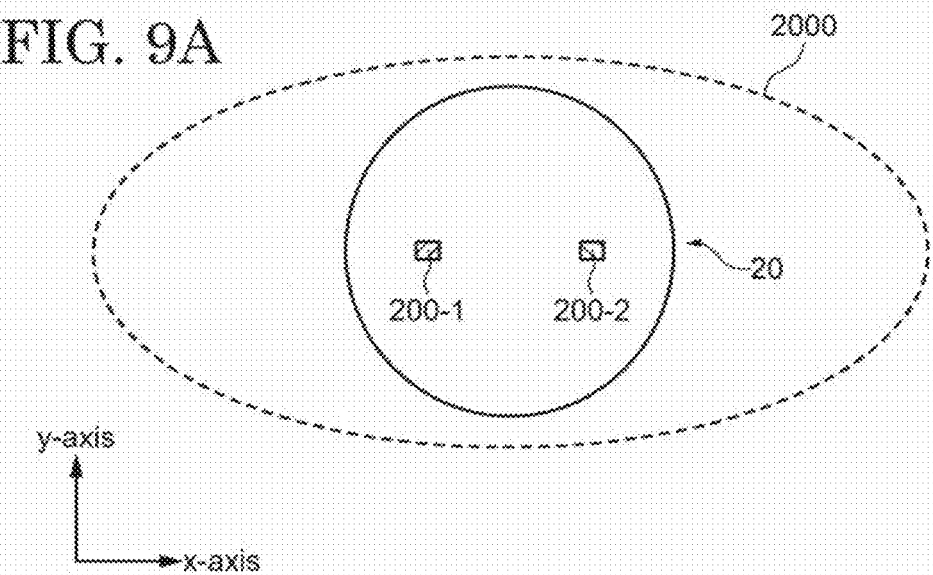
FIG. 9A is a schematic plan view showing an arrangement of light emitting elements of a light source of a lighting device according to an embodiment of the present invention.
Figure 9B:
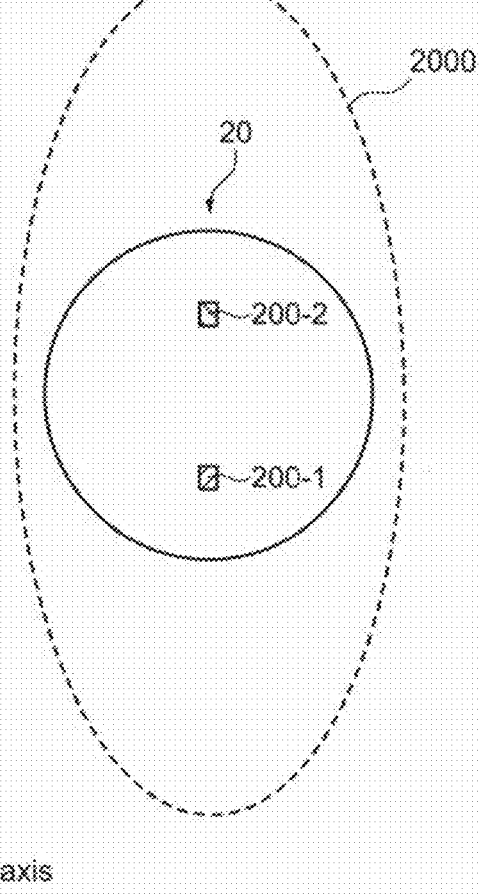
FIG. 9B is a schematic plan view showing an arrangement of light emitting elements of a light source of a lighting device according to an embodiment of the present invention.
Figure 10D:
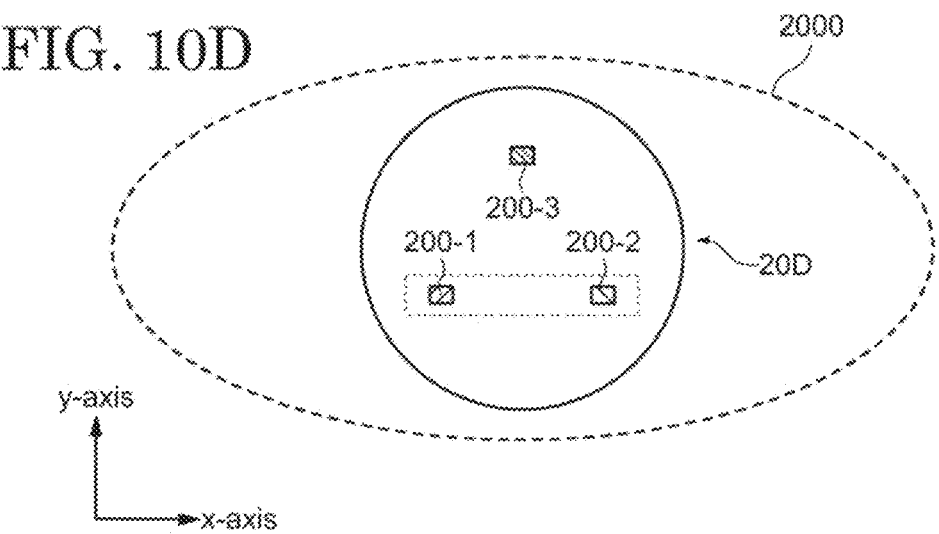
FIG. 10D is a schematic plan view showing an arrangement of light emitting elements of a light source of a lighting device according to an embodiment of the present invention.
Figure 10E:
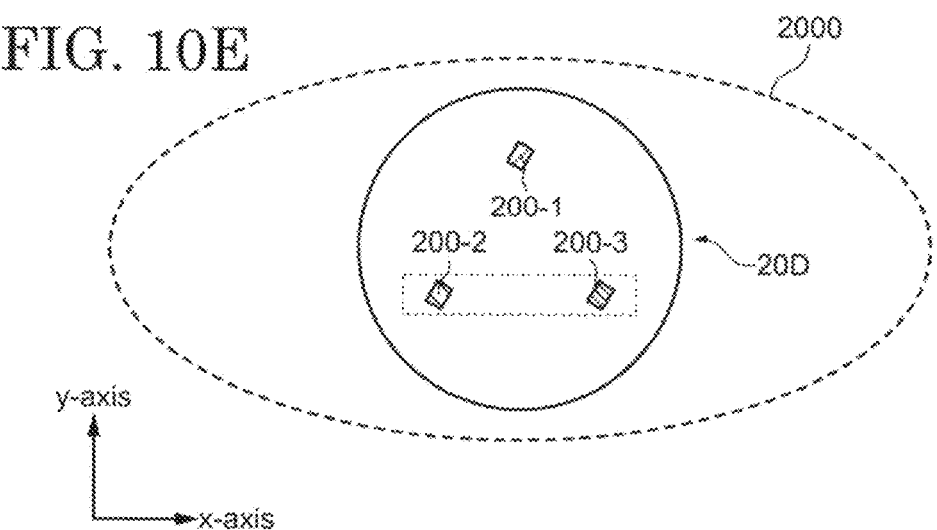
FIG. 10E is a schematic plan view showing an arrangement of light emitting elements of a light source of a lighting device according to an embodiment of the present invention.
Figure 10F:
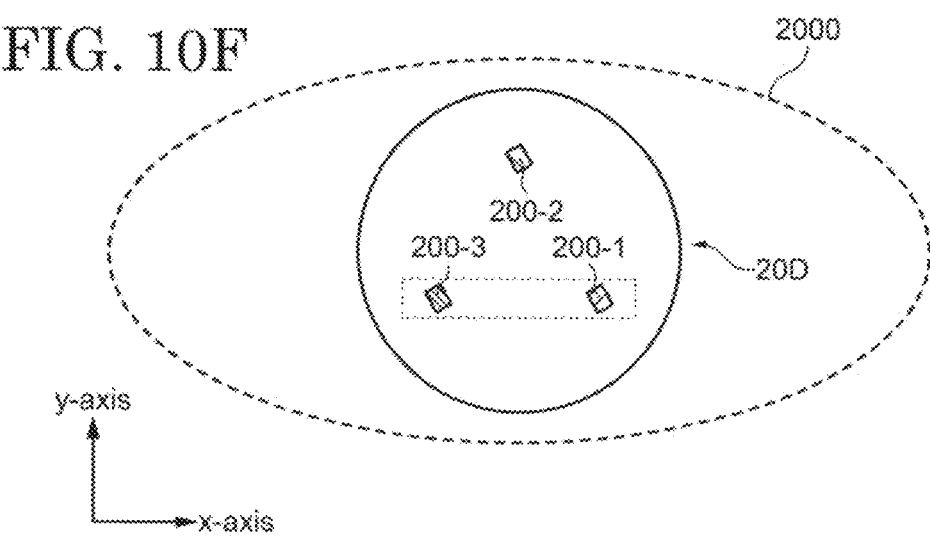
FIG. 10F is a schematic plan view showing an arrangement of light emitting elements of a light source of a lighting device according to an embodiment of the present invention.
Figure 11A:
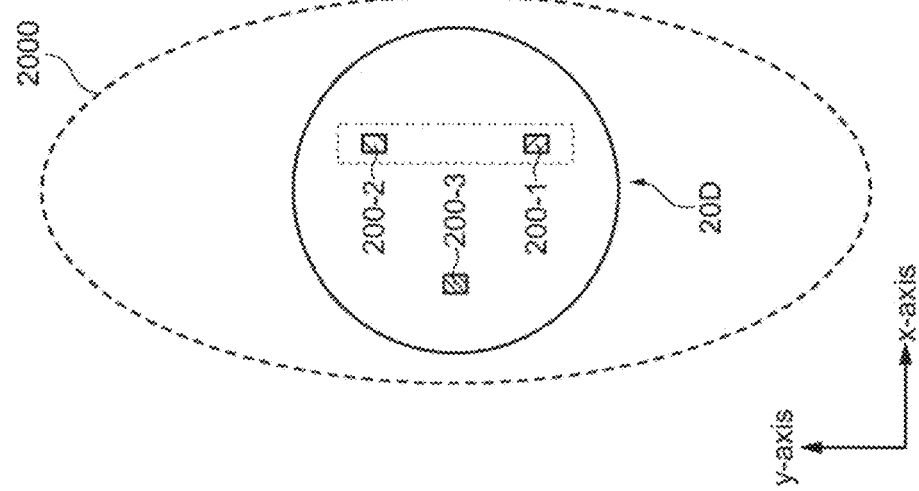
FIG. 11A is a schematic plan view showing an arrangement of light emitting elements of a light source of a lighting device according to an embodiment of the present invention.
Figure 11B:
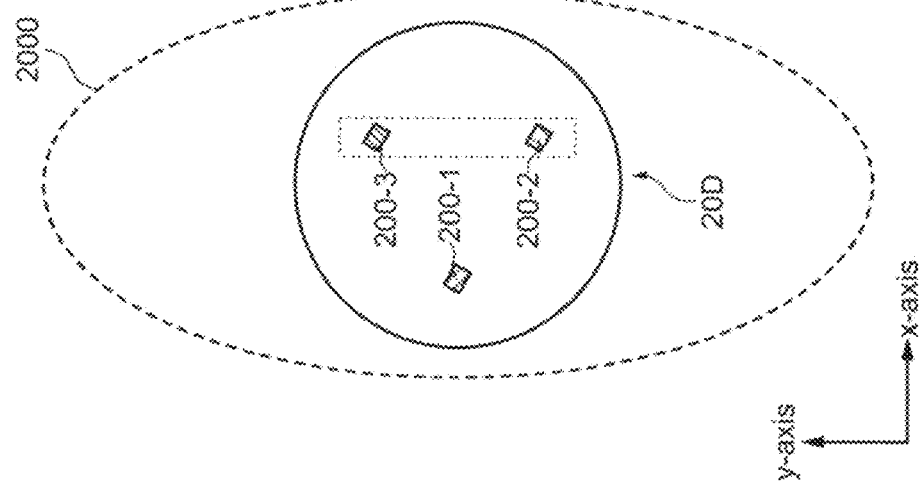
FIG. 11B is a schematic plan view showing an arrangement of light emitting elements of a light source of a lighting device according to an embodiment of the present invention.
Figure 11C:
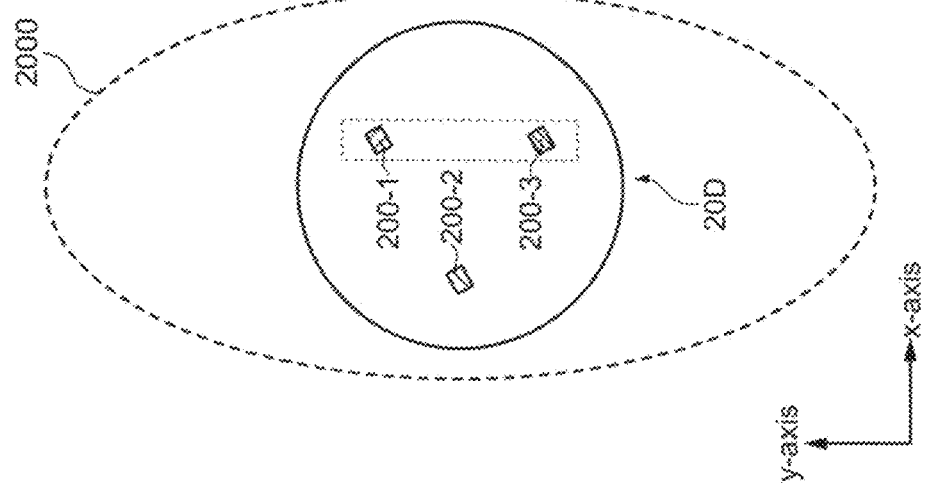
FIG. 11C is a schematic plan view showing an arrangement of light emitting elements of a light source of a lighting device according to an embodiment of the present invention.

FIGS. 9A and 9B are schematic plan views showing an arrangement of the light emitting elements 200 of the light source 20 of the lighting device 1 according to an embodiment of the present invention. In FIGS. 9A and 9B, the light source 20 including two light emitting elements 200 (a first light emitting element 200-1 and a second light emitting element 200-2) and the light distribution shape 2000 (a dotted ellipse in the figure) of the irradiation surface by the light emitted from the optical element 10 are shown.

The light distribution shape 2000 shown in FIG. 9A has a shape extending in the x-axis direction by diffusing the light irradiated from the light source 20 in the x-axis direction during the process of being transmitted through the optical element 10. In the light source 20 of the lighting device 1 in which the light distribution shape 2000 extending in the x-axis direction is the main feature, the first light emitting element 200-1 and the second light emitting element 200-2 are arranged along the x-axis direction. Further, the light distribution shape 2000 shown in FIG. 9B has a shape extending in the y-axis direction by diffusing the light irradiated from the light source 20 in the y-axis direction during the process of being transmitted through the optical element 10. In the light source 20 of the lighting device 1 in which the light distribution shape 2000 extending in the y-axis direction is the main feature, the first light emitting element 200-1 and the second light emitting element 200-2 are arranged along the y-axis direction. In other words, in the light source 20, the two light emitting elements 200 are arranged so as to be approximately parallel to the extending direction of the light distribution shape 2000.

According to the above-described arrangement configuration of the two light emitting elements 200, the diffusion direction of the light irradiated from the first light emitting element 200-1 and the second light emitting element 200-2 coincides with the arrangement direction of the first light emitting element 200-1 and the second light emitting element 200-2. Therefore, the overlapping state of the light from the two light emitting elements 200 is maintained throughout the diffusion direction of the light, and it becomes only slightly difficult to maintain the overlapping state of the light at the edge portion of the light distribution shape 2000 in the diffusion direction. Therefore, according to this arrangement configuration, the light of different color temperatures irradiated by each of the first light emitting element 200-1 and the second light emitting element 200-2 is easily mixed throughout the light distribution direction.

FIGS. 10A to 11F are schematic plan views showing the arrangement of the light emitting elements 200 of the light source 20D of the lighting device 1 according to an embodiment of the present invention. In addition to the light source 20D including three light emitting elements 200 (a first light emitting element 200-1, a second light emitting element 200-2, and a third light emitting element 200-3), a light distribution shape 2000 (a dotted ellipse in the figure) of the irradiation surface by the light emitted from the optical element 10 is shown in FIGS. 10A to 11F.

The light distribution shape 2000 shown in FIGS. 10A to 10F has a shape extending in the x-axis direction by diffusing the light irradiated from the light source 20D in the x-axis direction during the process of being transmitted through the optical element 10. In the light source 20D of the lighting device 1 in which the light distribution shape 2000 extending in the x-axis direction is the main feature, at least two of the first light emitting elements 200-1 to the third light emitting elements 200-3 are arranged along the x-axis direction. Further, the light distribution shape 2000 shown in FIGS. 11A to 11F has a shape extending in the y-axis direction by diffusing the light irradiated from the light source 20D in the y-axis direction during the process of being transmitted through the optical element 10. In the light source 20D of the lighting device 1 in which the light distribution shape 2000 extending in the y-axis direction is the main feature, two of the first light emitting element 200-1 to the third light emitting element 200-3 are arranged along the y-axis direction. In other words, in the light source 20D, two of the three light emitting elements 200 are arranged so as to be substantially parallel to the extending direction of the light distribution pattern 2000.

According to the above-described arrangement configuration of the three light emitting elements 200, the diffusion direction of the light irradiated from the two light emitting elements 200 arranged along the extending direction coincides with the light distribution direction between the two light emitting elements 200, thereby suppressing the visible difference in color temperature of the light emitting elements 200, as in FIG. 9A or 9B.

Although the arrangement configurations of two and three light emitting elements 200 are described above, the same configuration can be applied to an arrangement configuration of four or more light emitting elements 200.

Fourth Embodiment

The number of light sources 20 in the lighting device 1 is not limited to a specific number. In the present embodiment, in the case where the lighting device 1 includes two light sources 20D, an arrangement of the light sources 20D and an arrangement of the light emitting elements 200 are described with reference to FIG. 12.

Figure 12:
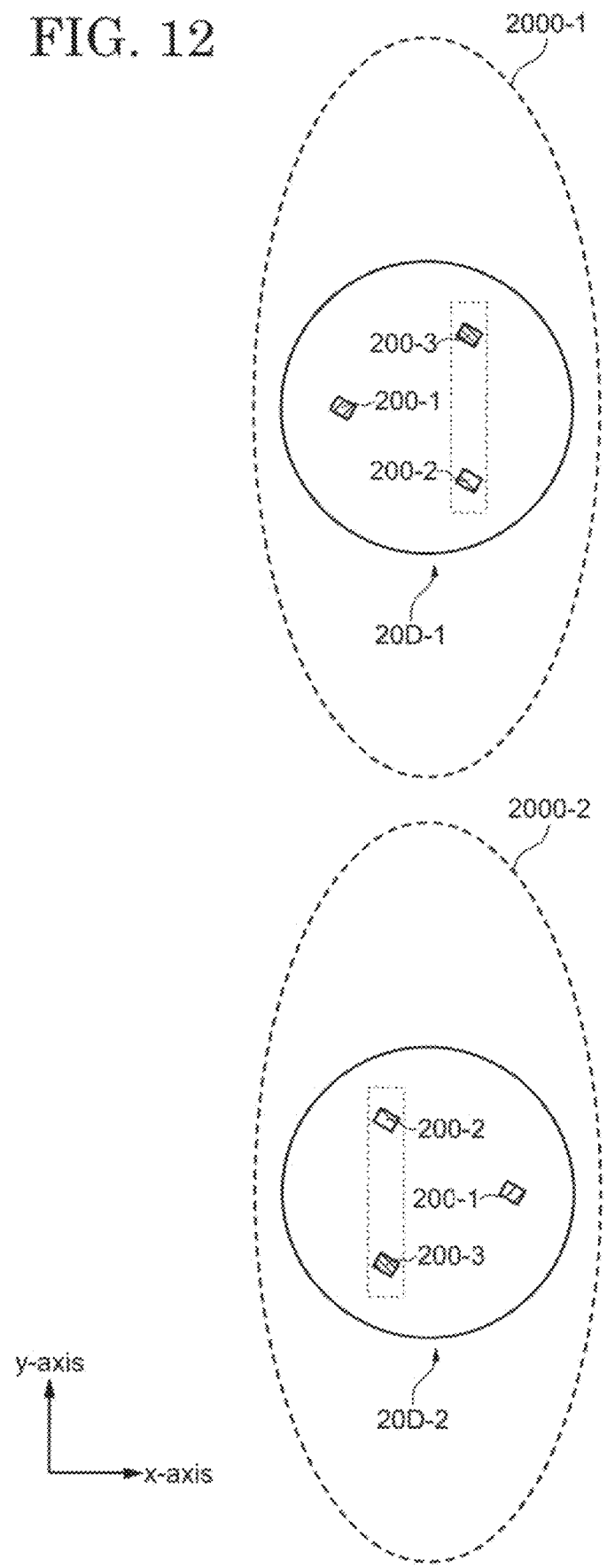
FIG. 12 is a schematic plan view showing an arrangement of light emitting elements of two light sources of a lighting device according to an embodiment of the present invention.

FIG. 12 is a schematic plan view showing the arrangement of two light sources 20D (a first light source 20D-1 and a second light source 20D-2) of the lighting device 1 according to an embodiment of the present invention. In FIG. 12, light having a distribution shape elongated mainly in the y-axis direction is emitted from each of the first light source 20D-1 and the second light source 20D-2. In this case, the first light source 20D-1 and the second light source 20D-2 are arranged along the y-axis direction. Further, in each of the first light source 20D-1 and the second light source 20D-2, two light emitting elements 200 (see the second light emitting element 200-2 and the third light emitting element 200-3 in FIG. 12) among the first light emitting element 200-1 to the third light emitting element 200-3 are arranged along the y-axis direction. Furthermore, the second light emitting element 200-2 and the third light emitting element 200-3 of the first light source 20D-1 and the second light emitting element 200-2 and the third light emitting element 200-3 of the second light source 20D-2 are not arranged in a straight line in the y-axis direction, but are arranged in a zigzag line in the y-axis direction. In this way, when two light sources 20D each including three light emitting elements 200 are arranged side by side along the main light distribution direction, the arrangement directions of the two light emitting elements 200 are shifted from each other along the light distribution direction between the light sources 20D. This makes it possible to suppress the difference in color temperature of the light emitting elements 200 in the lighting device 1 from being visually recognized as a whole.

Although the arrangement of two light sources 20D and the arrangement of light emitting elements 200 are described above, the same configuration can be applied to an arrangement of three or more light sources 20D and an arrangement of light emitting elements 200.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. A lighting device comprising:
a light source comprising at least two types of light emitting elements with different color temperatures;
an optical element comprising a plurality of liquid crystal cells, the optical element configured to control a distribution of light emitted from the light source; and
a control unit configured to control the light source,
wherein the control unit controls the optical element to change from a first light distribution state to a second light distribution state different from the first light distribution state,
the control unit controls the light source so that a color temperature of light emitted in a direction perpendicular to a surface of the optical element is the same in the first light distribution state and the second light distribution state, and
the control unit controls the light source based on a voltage applied to the optical element for controlling a distribution angle of the light emitted from the optical element.

2. The lighting device according to claim 1, wherein the control unit controls the light source so that a front brightness from the optical element in the first light distribution state or the second light distribution state is greater than or equal to $1/100$ and less than or equal to 1 of a front brightness from the optical element in an initial state in which no voltage is applied to the optical element.

3. The lighting device according to claim 1, wherein the control unit controls an emission time of each of the at least two types of light emitting elements.

4. The lighting device according to claim 3, wherein the at least two types of light emitting elements comprises a first light emitting element with a color temperature of 2000 K and a second light emitting element with a color temperature of 6500 K.

5. The lighting device according to claim 3, wherein the at least two types of light emitting elements are alternatively arranged in a radial pattern.

6. The lighting device according to claim 5, wherein the at least two types of light emitting elements comprises a first light emitting element with a color temperature of 2000 K and a second light emitting element with a color temperature of 6500 K.

* * * * *